US010222020B2

(12) United States Patent
Toko

(10) Patent No.: US 10,222,020 B2
(45) Date of Patent: Mar. 5, 2019

(54) LIGHTING FIXTURE

(71) Applicant: STANLEY ELECTRIC CO., LTD., Meguro-ku, Tokyo (JP)

(72) Inventor: Yasuo Toko, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 1036 days.

(21) Appl. No.: 14/638,554

(22) Filed: Mar. 4, 2015

(65) Prior Publication Data

US 2015/0267889 A1 Sep. 24, 2015

(30) Foreign Application Priority Data

Mar. 20, 2014 (JP) .................................. 2014-057524
Mar. 20, 2014 (JP) .................................. 2014-057525

(51) Int. Cl.
| | | |
|---|---|---|
| *G02F 1/15* | (2006.01) | |
| *F21S 41/36* | (2018.01) | |
| *F21S 41/64* | (2018.01) | |
| *F21S 41/67* | (2018.01) | |
| *F21S 41/25* | (2018.01) | |
| *F21W 102/00* | (2018.01) | |
| *F21S 41/365* | (2018.01) | |

(52) U.S. Cl.
CPC .............. *F21S 41/36* (2018.01); *F21S 41/645* (2018.01); *F21S 41/67* (2018.01); *G02F 1/1506* (2013.01); *F21S 41/25* (2018.01); *F21S 41/365* (2018.01); *F21W 2102/00* (2018.01)

(58) Field of Classification Search
CPC ...................... G02B 26/080816; G02B 26/00; G02B 26/02; G02B 26/08; G02B 26/0816; G02B 26/0833

USPC ........ 359/237, 238, 240, 241, 245, 290–292
See application file for complete search history.

(56) References Cited

U.S. PATENT DOCUMENTS

| | | | |
|---|---|---|---|
| 5,161,875 A | 11/1992 | Sekiguchi et al. | |
| 2008/0198372 A1* | 8/2008 | Pan | B60Q 1/38 356/121 |

(Continued)

FOREIGN PATENT DOCUMENTS

| | | |
|---|---|---|
| DE | 19860669 A1 | 7/2000 |
| DE | 10330215 A1 | 1/2005 |

(Continued)

OTHER PUBLICATIONS

Extended European Search Report dated Jul. 20, 2015, issued in counterpart European Application No. 15158805.0.

(Continued)

*Primary Examiner* — Robert E. Tallman
(74) *Attorney, Agent, or Firm* — Holtz, Holtz & Volek PC

(57) ABSTRACT

There is provided a lighting fixture including: a light source that emits a light beam; an electrodeposition device that includes multiple pixels of which a transparent state and a mirror state are switchable, independently, and that is disposed such that a normal direction of a pixel surface is not parallel to an optical axis direction of an incident light beam on an optical path of a light beam emitted from the light source; and an optical system that emits, as an illumination beam, both a light beam transmitted through the electrodeposition device and a light beam reflected from the pixel in the mirror state in the electrodeposition device.

14 Claims, 18 Drawing Sheets

(56) References Cited

U.S. PATENT DOCUMENTS

2011/0013412 A1     1/2011   Kobayashi
2011/0305029 A1   12/2011   Chuang et al.
2013/0107559 A1     5/2013   Gava

FOREIGN PATENT DOCUMENTS

| | | |
|---|---|---|
| EP | 2275735 A1 | 1/2011 |
| JP | 2000195311 A | 7/2000 |
| JP | 2008120162 A | 5/2008 |
| JP | 2012009435 A | 1/2012 |
| JP | 2012181389 A | 9/2012 |

OTHER PUBLICATIONS

Japanese Office Action dated Nov. 14, 2017 issued in counterpart Japanese Application No. 2014-057524.
Japanese Office Action dated Nov. 14, 2017 issued in counterpart Japanese Application No. 2014-057525.

\* cited by examiner

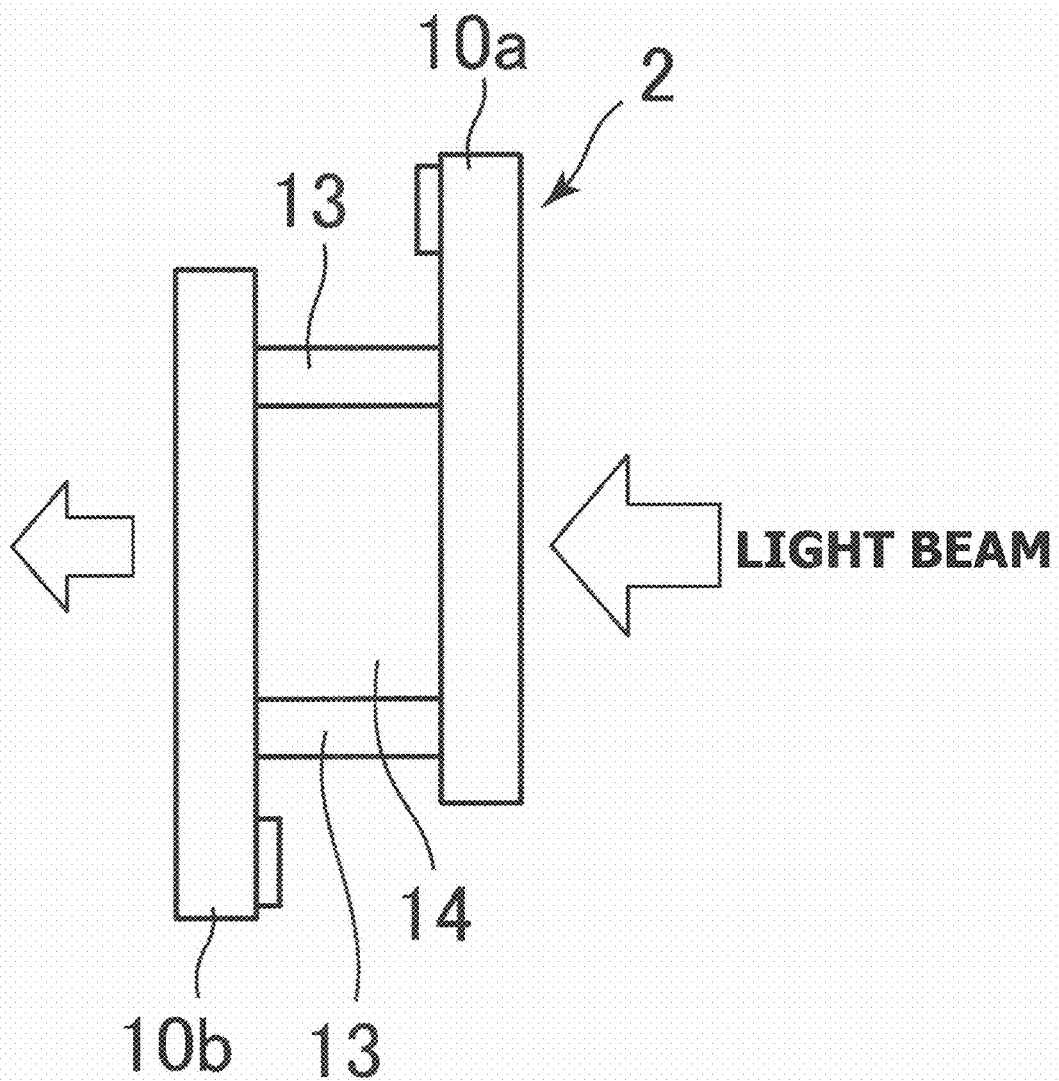

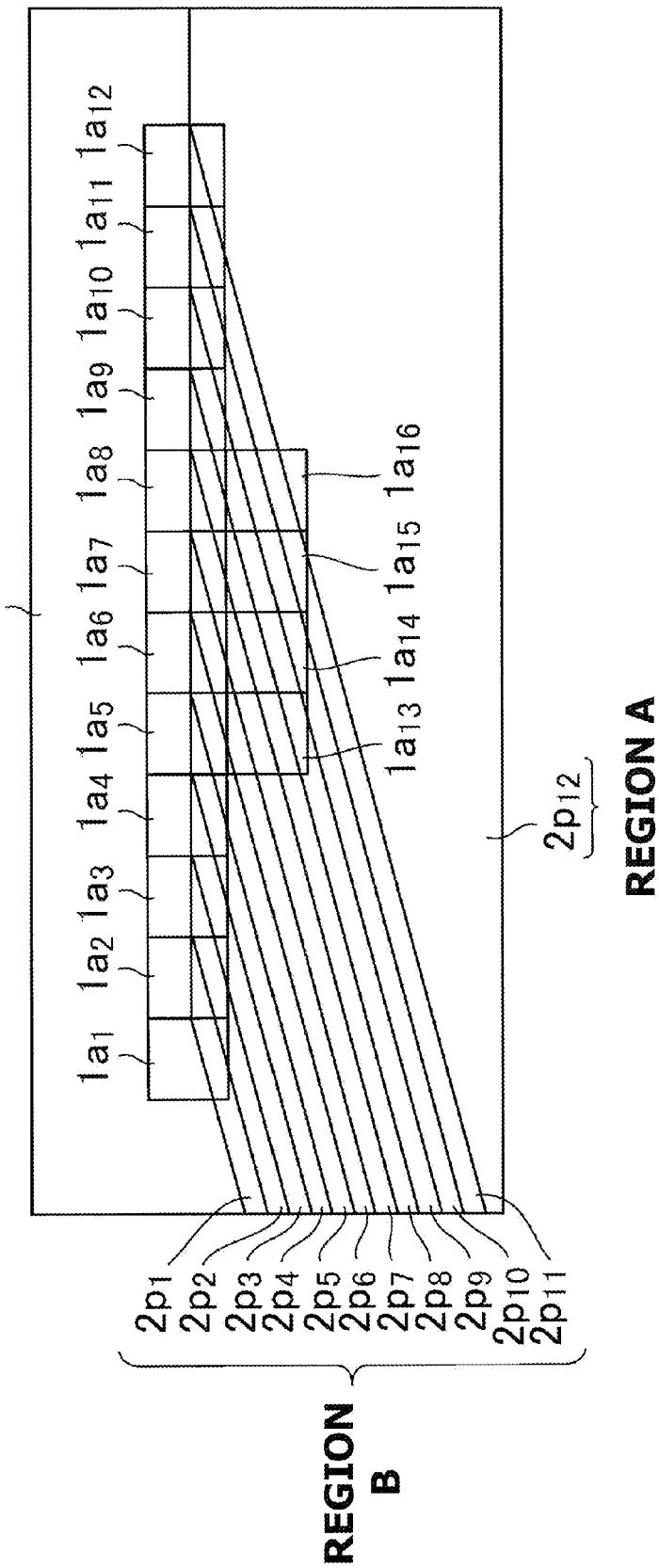

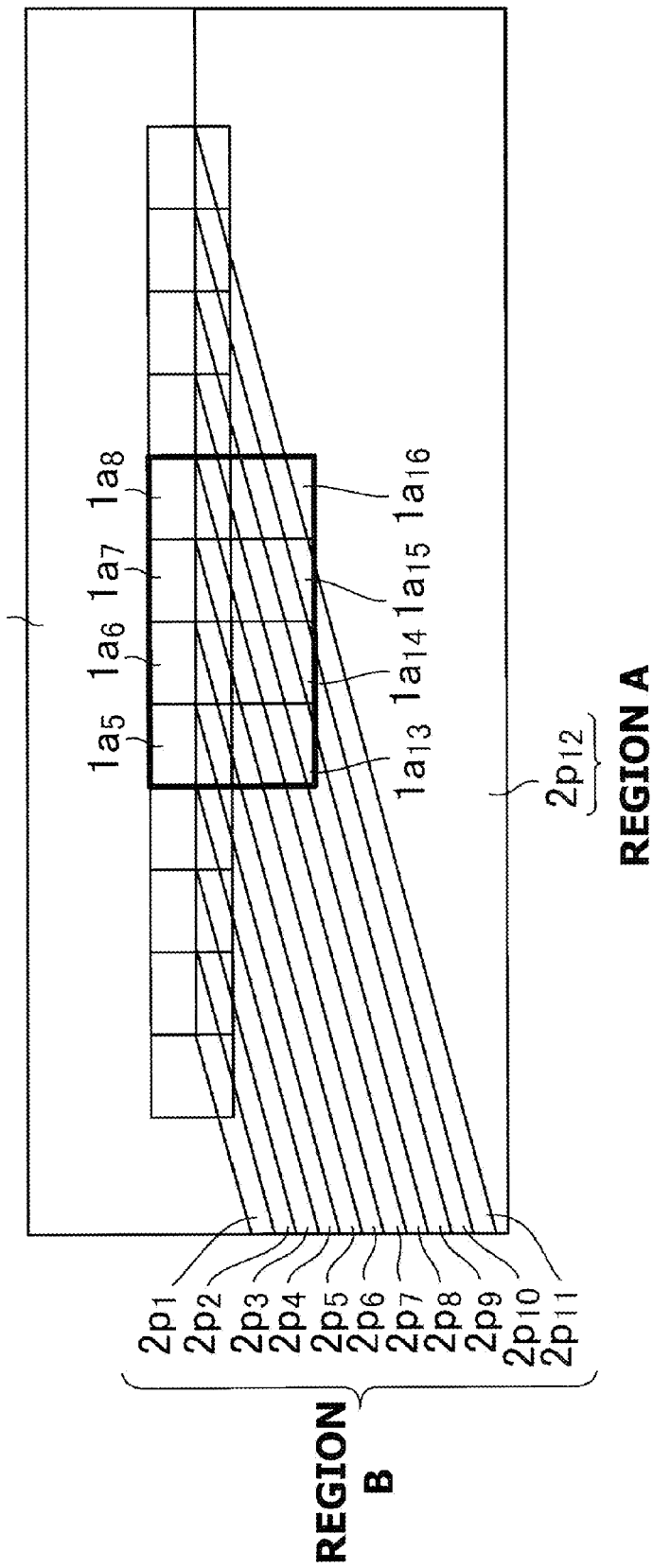

LIGHTING FIXTURE

CROSS-REFERENCES TO RELATED APPLICATION

This application is based upon and claims the benefit of priority of the prior Japanese Patent Applications No. JP 2014-057524 and No. JP 2014-057525, filed on Mar. 20, 2014, the entire contents of which are incorporated herein by reference.

BACKGROUND OF THE INVENTION

A) Field of the Invention

The present invention relates to a lighting fixture that includes an electrodeposition device.

B) Description of the Related Art

A vehicle lighting device that efficiently notifies a driver of the presence of an illumination target such as a pedestrian is disclosed (see Japanese Unexamined Patent Application Publication No. 2008-120162).

A headlight used in a vehicle lighting device disclosed in Japanese Unexamined Patent Application Publication No. 2008-120162 is configured of, for example, a digital micromirror device (DMD). The DMD is a device that includes multiple micromirrors and can control the rotation of each of the multiple micromirrors. Since the rotation of the micromirror is performed using mechanical means, the headlight disclosed in Japanese Unexamined Patent Application Publication No. 2008-120162 has a problem in that the device is vulnerable to vibration, has low durability, it is difficult to achieve miniaturization or thinness, or the like. In addition, since the headlight disclosed in Japanese Unexamined Patent Application Publication No. 2008-120162 uses a perfectly reflective optical system, light loss due to reflection, and further, light loss due to aperture ratio is great. In the headlight disclosed in Japanese Unexamined Patent Application Publication No. 2008-120162, it is considered that light use efficiency is practically less than 70%.

An electrochromic device has been known as a nonradiative device that uses a color variation phenomenon of a substance by an electrochemical reversible reaction (electrolytic oxidation reduction reaction) when a voltage is applied.

Among electrochromic materials (materials that have a electrochemical oxidation or reduction reaction when a voltage is applied and thereby, have color variation such as coloring or decoloring), a material of which a part is, for example, precipitated or deposited (electrodeposited) on an electrode, or disappears from an electrode by an oxidation or reduction reaction is referred to as an electrodeposition material. In addition, a device that uses the electrodeposition material is referred to as an electrodeposition device.

An electrodeposition device that has a high quality mirror state is disclosed (see Japanese Unexamined Patent Application Publication No. 2012-181389). The electrodeposition device includes, for example, an electrolyte layer that contains a silver complex, and realizes the mirror state by applying a voltage and causing silver to be precipitated on an electrode. Further, the electrolyte layer contains, for example, copper. The electrodeposition device realizes a transparent state when no voltage is applied.

SUMMARY OF THE INVENTION

It is an object of the present invention to provide a lighting fixture that has high beam distribution controllability.

In addition, there is provided a lighting fixture in which a light beam is reusable.

According to an aspect of the invention, there is provided a lighting fixture including: a light source that emits a light beam; an electrodeposition device that includes multiple pixels of which a transparent state and a mirror state are switchable, independently, and that is disposed such that a normal direction of a pixel surface is not parallel to an optical axis direction of an incident light beam on an optical path of a light beam emitted from the light source; and an optical system that emits, as an illumination beam, both a light beam transmitted through the electrodeposition device and a light beam reflected from the pixel in the mirror state in the electrodeposition device.

According to the invention, it is possible to provide a lighting fixture that has high beam distribution controllability.

In addition, it is possible to provide a lighting fixture in which a light beam is reusable.

BRIEF DESCRIPTION OF THE DRAWINGS

FIG. 3 is a schematic view illustrating an arrangement state of the electrodeposition device 2 while measuring optical characteristics.

FIG. 10 is a partial plan view schematically illustrating the electrodeposition device 2 that is used in the lighting fixture according to Example 3.

FIG. 11 is a schematic view illustrating a pixel state during driving beam distribution and a beam-emitting state of the light-emitting unit 1.

DESCRIPTION OF EMBODIMENTS

Figure 1:
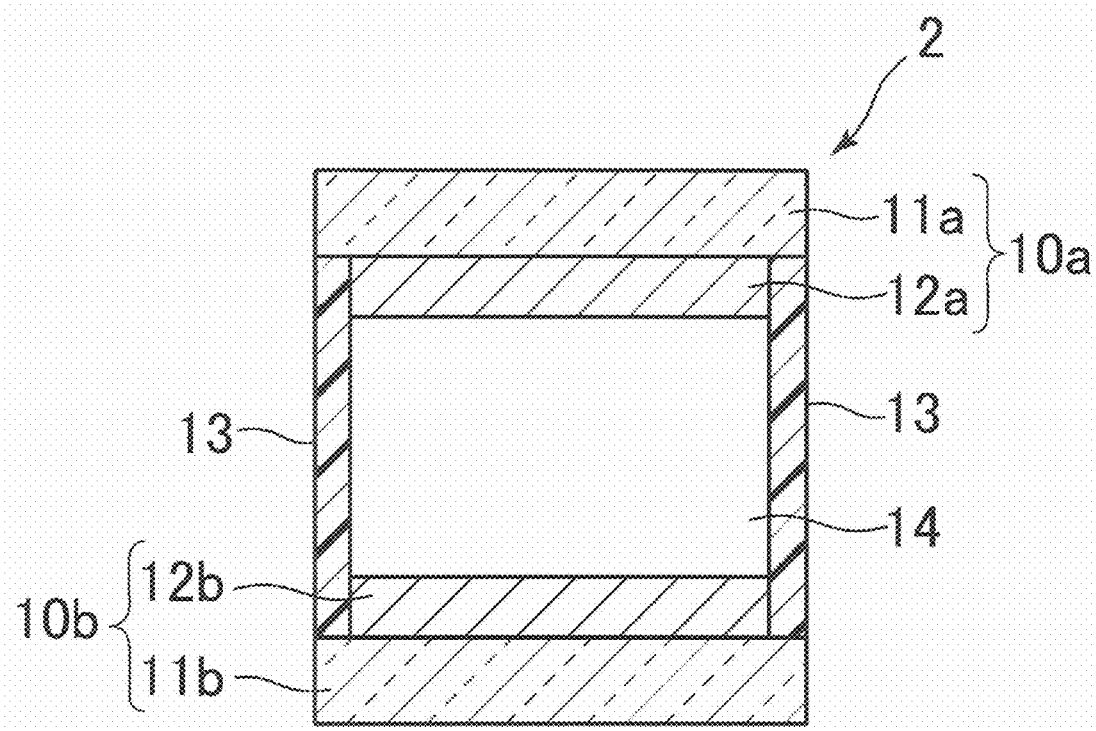
FIG. 1 is a schematic cross-sectional view illustrating an electrodeposition device 2 which is used in a lighting fixture according to Example 1.

FIG. 1 is a schematic cross-sectional view illustrating an electrodeposition device 2 which is used in a lighting fixture according to Example 1.

The electrodeposition device 2 is configured to include an upper substrate (segment substrate) 10a and a lower substrate (common substrate) 10b which are arranged facing each other so as to be spaced, for example, substantially in parallel, and an electrolyte layer 14 disposed between both the substrates 10a and 10b.

The upper substrate 10a and the lower substrate 10b include an upper transparent substrate 11a and a lower transparent substrate 11b, respectively, and an upper transparent electrode (segment electrode) 12a and a lower transparent electrode (common electrode) 12b which are formed on the transparent substrates 11a and 11b, respectively. The transparent electrodes 12a and 12b have smooth surfaces. The upper transparent substrate 11a and the lower transparent substrate 11b are, for example, glass substrates and the upper transparent electrode 12a and the lower transparent electrode 12b are formed of, for example, ITO.

The electrolyte layer 14 is disposed in an inside region of a sealing section 13 between the upper substrate 10a and the lower substrate 10b and contains an electrodeposition material (for example, $AgNO_3$) containing silver.

Figure 2A:
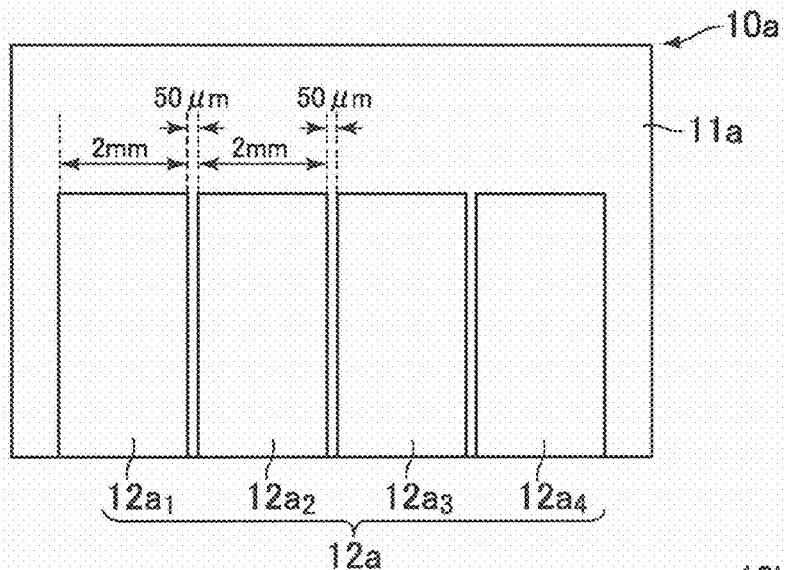
FIG. 2A is a schematic plan view of an upper substrate 10a, FIG. 2B is a schematic plan view of a lower substrate 10b.

FIG. 2A is a schematic plan view of the upper substrate 10a. The upper transparent electrode 12a is a patterning electrode formed on the upper transparent substrate 11a. The upper transparent electrode 12a is formed to have four transparent electrodes $12a_1$ to $12a_4$ which are electrically independent from each other. An electrode width of each of the transparent electrodes $12a_1$ to $12a_4$ is, for example, 2 mm and a distance between each of the transparent electrodes $12a_1$ to $12a_4$ is, for example, 50 µm. The electrode width and the inter-electrode distance are not limited thereto.

Figure 2B:
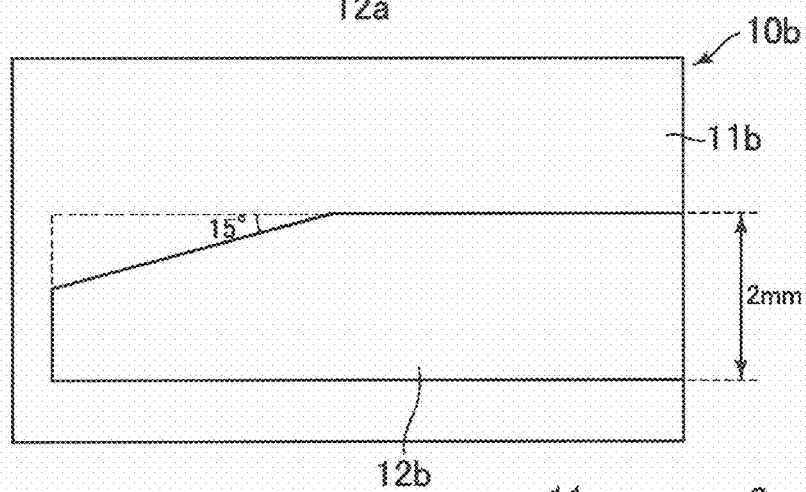
FIG. 2C is a schematic plan view of the electrodeposition device 2.

FIG. 2B is a schematic plan view of the lower substrate 10b. The lower transparent electrode 12b is formed on the lower transparent substrate 11b and has an electrode pattern of a shape in which a region of a right triangle of which an angle is 15° is cut off from one corner of a rectangle of which the short side (electrode width) is 2 mm.

Figure 2C:
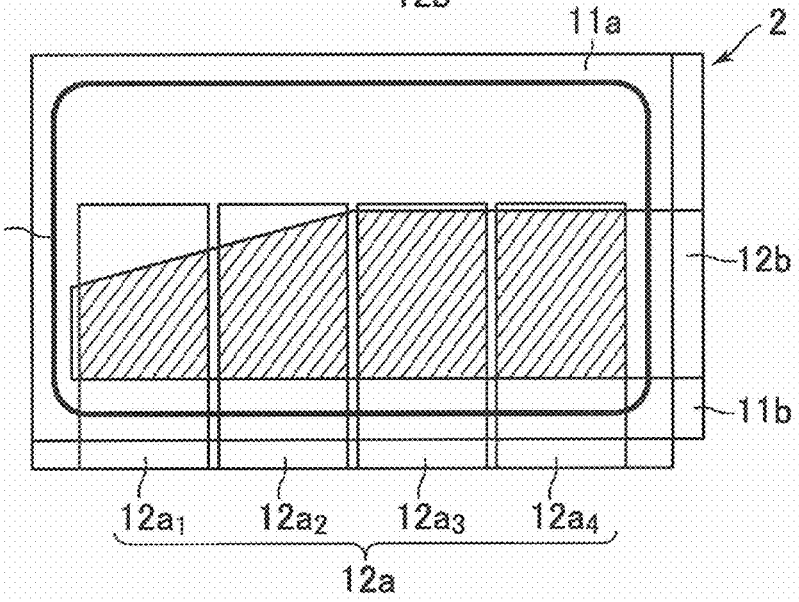

FIG. 2C is a schematic plan view of the electrodeposition device 2. Pixels are demarcated in a region in which the electrodes $12a_1$ to $12a_4$ and the electrode 12b are overlapped when viewed in a normal direction of the substrates 10a and 10b. In the drawing, the pixel is marked by diagonal lines. The electrodeposition device 2 includes four pixels which are arranged in one direction (horizontal direction in the drawing) at inter-electrode intervals of 50 µm. Two pixels on the right side have square shapes of 2 mm×2 mm. Two pixels on the left side have trapezoidal shapes. The pixels are arranged in the inside region of the sealing section 13.

In the electrodeposition device 2, a transparent state and a non-transparent state (mirror state) of each pixel are electrically switchable by a DC voltage applied to the electrodes 12a and 12b.

When no voltage is applied, a light beam incident to the electrodeposition device 2 is transmitted therethrough.

When a voltage is applied and, as an example, when the lower transparent electrode 12b is grounded and a DC voltage of −2.5 V is applied to the upper transparent electrode 12a, a silver ion contained in the electrolyte layer 14 is reduced, is converted into metal silver in the vicinity of the upper transparent electrode 12a (electrode on a negative voltage side), is precipitated and deposited on the electrode 12a, and a thin silver film is formed. The thin silver film works as a mirror and regularly reflects a light beam incident to the electrodeposition device 2 (pixel). Although varying depending on an area, an employed material, or the like, of a pixel, it is possible to form a thin silver film by setting a potential difference of 1.5 V to 8 V between the upper transparent electrode 12a and the lower transparent electrode 12b.

The thin silver film disappears from the upper transparent electrode 12a by cutting OFF of the voltage (0 V or open state) or applying a reverse bias (for example, +1 V). When the reverse bias is applied, it is possible to cause the silver to rapidly disappear and for the electrodeposition device 2 to enter into the transparent state.

It is possible to use the electrodeposition device 2 as a mirror device that interchangeably realizes the transparent state and the mirror state (reflective state) of a pixel position by applying a DC voltage or no DC voltage.

It is possible to apply a voltage to the pixels (electrodes $12a_1$ to $12a_4$) of the electrodeposition device 2, independently. In the electrodeposition device 2, the transparent state and the mirror state are arbitrarily switchable at a pixel unit.

The electrodeposition device 2 is prepared, for example, as follows.

A pair of transparent electrode pattern attached glass substrates (substrates 10a and 10b) are prepared. A smooth transparent conductive film, for example, an ITO film is used as the transparent electrode on the glass substrate. It is possible to form the transparent conductive film by sputtering, CVD, vapor deposition, or the like.

A pair of glass substrates are arranged such that the ITO films face each other and are converted into a cell.

For example, a gap control agent with, for example, a diameter of 20 µm to hundreds of µm, a diameter of 500 µm in the example, is sprayed on one of the pair of substrates so as to be, for example, 1 to 3 grains/mm². Depending on the diameter of the gap control agent, it is desirable to have a spray volume which is not likely to affect a function of the lighting fixture. In the electrodeposition device 2 used in the lighting fixture according to the example, although there is slight gap irregularity, the effect is small. Therefore, the spray volume of the gap control agent is not highly important. In addition, in the example, gap control is performed using the gap control agent; however, it is possible to perform the gap control by a protrusion such as a rib. Further, in a case of a small cell, a film-shaped spacer with a predetermined thickness may be disposed in the sealing portion and the gap control may be performed.

A main seal pattern optical system is formed on the other of the pair of substrates. In the example, an ultraviolet cured and thermally cured type seal material is used. As the seal material, a photocuring type or a thermally curing type may be used. The spray of the gap control agent and the formation of the main seal pattern may be performed on the same substrate side.

Next, an electrolytic solution that contains the electrodeposition material is sealed between the pair of substrates.

In the example, an ODF method is used. The electrolytic solution containing the electrodeposition material trickles down onto the one of the pair of substrates in an appropriate amount. As a trickle-down method, various printing methods including a dispenser or an ink jet can be applied. Here, the dispenser is used. It is preferable that the seal material described above is a seal material (noncorrosive seal material) that is resistant to the employed electrolytic solution.

Superposition of the pair of substrates is performed in the vacuum; but, may be performed in the atmosphere, or in a nitrogen atmosphere.

The seal material is irradiated with an ultraviolet ray having an energy density of 6 J/cm$^2$, the seal material is cured, and then the sealing section 13 is formed. An SUS mask is used such that the seal material is only irradiated with the ultraviolet ray.

The electrolytic solution that contains the electrodeposition material is configured to contain an electrodeposition material ($AgNO_3$ or the like), an electrolyte (TBABr or the like), a mediator ($CuCl_2$ or the like), a supporting electrolyte (LiBr or the like), a solvent (dimethyl sulfoxide (DMSO) or the like), a gelling polymer (polyvinyl butyral (PVB) or the like), or the like. According to the example, to the DMSO as a solvent, 50 mM of $AgNO_3$ as the electrodeposition material is added, 250 mM of LiBr as the supporting electrolyte is added, and 10 mM of $CuCl_2$ as the mediator is added. Then, 10 wt % of PVB as a host polymer is added and a gel-state (jelly-state) electrolyte layer 14 is formed.

It is possible to use, for example, $AgNO_3$, $AgClO_4$, AgBr, or the like which contains silver as the electrodeposition material.

The supporting electrolyte is not limited as long as an oxidation reduction reaction or the like of the electrodeposition material is promoted, and for example, lithium salts (LiCl, LiBr, LiI, $LiBF_4$, $LiClO_4$ or the like), potassium salts (KCl, KBr, KI, or the like), or sodium salts (NaCl, NaBr, NaI, or the like) can be appropriately used. Concentration of the supporting electrolyte is preferably, for example, from 10 mM to 1M, but there is no particular limitation thereto.

The solvent is not limited as long as the electrodeposition material can be stably held. A polar solvent such as water, propylene carbonate, an organic solvent which has no polarity, and further, an ionic liquid, an ionic conductive polymer, a polyelectrolyte, or the like can be used. Specifically, propylene carbonate, N,N-dimethylformamide, tetrahydrofuran, acetonitrile, polyvinyl sulfate, polystyrene sulfonic acid, polyacrylic acid, or the like can be appropriately used.

The prepared electrodeposition device 2 is observed, and the device is substantially transparent in an initial state. Although the device looks slightly yellowish, it is thought that the color is from the color of $CuCl_2$ as the mediator. It is possible to obtain a colorless transparent electrolyte layer 14 by using a different material as the mediator or making the cell thin.

The inventor of the application measured optical characteristics (transmittance characteristics and reflectance characteristics) of the electrodeposition device 2.

FIG. 3 illustrates an arrangement state of the electrodeposition device 2 during measurement. In the measurement, a light beam is caused to be incident in a substrate normal direction from the substrate 10a side. In addition, a DC voltage is applied such that the substrate 10a becomes the negative voltage side. That is, the measurement beam is incident to the electrodeposition device 2 from the substrate side which causes silver to be precipitated.

Figure 4A:
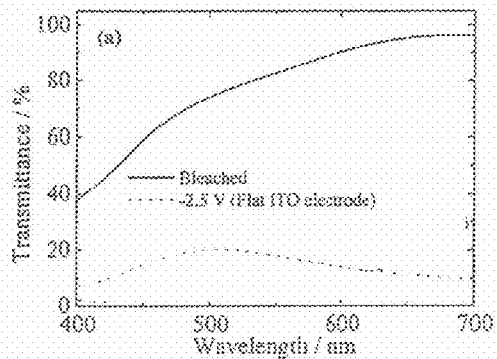
FIG. 4A and FIG. 4B are graphs showing transmittance characteristics and reflectance characteristics of the electrodeposition device 2, respectively.
Figure 4B:
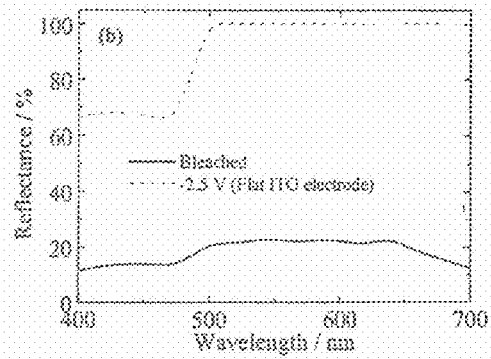

FIG. 4A and FIG. 4B are graphs showing transmittance characteristics and reflectance characteristics of the electrodeposition device 2, respectively. In the graph in FIG. 4A, a wavelength is represented by unit "nm" on the horizontal axis and transmittance is represented by "%" on the vertical axis. In the graph in FIG. 4B, a wavelength is represented by unit "nm" on the horizontal axis and reflectance is represented by "%" on the vertical axis. In the graphs in FIG. 4A and FIG. 4B, a curved line in a solid line represents transmittance and reflectance, respectively, in a no-voltage application, and a curved line in a dotted line represents transmittance and reflectance, respectively, in a state in which a DC voltage of −2.5 V is applied to the substrate 10a. The transmittance and reflectance are values obtained when optical transmittance is 100% in the air. The electrodeposition device 2 is observed when a voltage is applied, it is confirmed that mirror reflection is marked.

The curved line in a solid line in FIG. 4A is referred to. Although slight wavelength dependence is shown in the transmittance when no voltage is applied, and a relationship that, when the wavelength is short, the transmittance is low is found, it is understood that 80% or more of light on average is transmitted. In addition, it is understood from the transmittance curve the reason that the device is slightly yellowish. Since it is thought that that the color is from the color of $CuCl_2$ as the mediator, it is possible to improve by, for example, making the cell thin. In addition, it is possible to realize flat transmittance by using a different material.

When the curve in a dotted line in FIG. 4A is referred to, it is understood that about 20% or less of light is transmitted (light leakage) regardless of the wavelength even when a voltage is applied (mirror state). This can be improved by examining, for example, an experimental condition or a configuration of the electrolyte layer.

The curve in a dotted line in FIG. 4B is referred to. It is understood that high transmittance that is, transmittance of 80% or more of light on average is obtained crossing a wide wavelength region when the voltage is applied (mirror state).

When the curve in a solid line in FIG. 4B is referred to, it is understood that about 10% to 20% of light is transmitted due to surface reflection, regardless of the wavelength even when a voltage is not applied. This reflection can be suppressed to be low by, for example, forming an antireflection film.

Figure 5A:
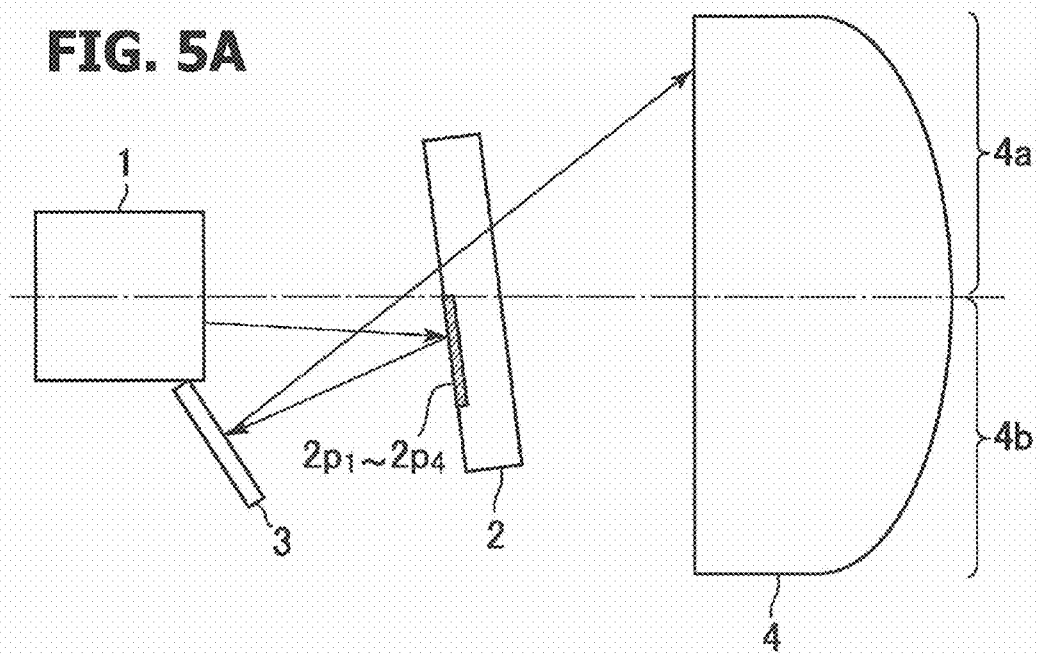
FIG. 5A is a schematic view illustrating the lighting fixture according to Example 1.

FIG. 5A is a schematic view illustrating the lighting fixture (vehicle headlight) according to Example 1. The lighting fixture according to Example 1 includes a light-emitting unit (light source) 1, the electrodeposition device 2, a reflective plate 3, and a projector lens 4. For example, an upward direction in the drawing corresponds to a perpendicularly upper side and a downward direction in the drawing corresponds to a perpendicularly lower side.

A light beam is emitted from a single light-emitting unit 1. An optical axis direction of the emitted light beam is, for example, a horizontal direction in the drawing. The light beam emitted from the light-emitting unit 1 is incident to the electrodeposition device 2 which is disposed such that a mirror surface is inclined from a perpendicular direction with respect to the optical axis. An angle of the mirror surface is set such that the reflected beam escapes from the light-emitting unit 1 and directs the reflective plate 3.

The electrodeposition device 2 includes four pixels $2p_1$ to $2p_4$ which are arranged in a direction and the transparent state and the mirror state are arbitrarily switchable at a pixel unit. The electrodeposition device 2 is disposed such that a normal line of a surface of the pixels $2p_1$ to $2p_4$ (electrode surface and substrate surface) is not parallel to an optical axis direction of the incident light beam. States of applying the voltage which is applied between the segment electrodes $12a_1$ to $12a_4$ and a common electrode 12b are varied, the transparent state and the mirror state are switched for each of the pixels $2p_1$ to $2p_4$ independently, and transmission or reflection of the incident light beam that is incident to the pixels $2p_1$ to $2p_4$ is performed at a unit of the pixels $2p_1$ to $2p_4$.

Figure 5B:
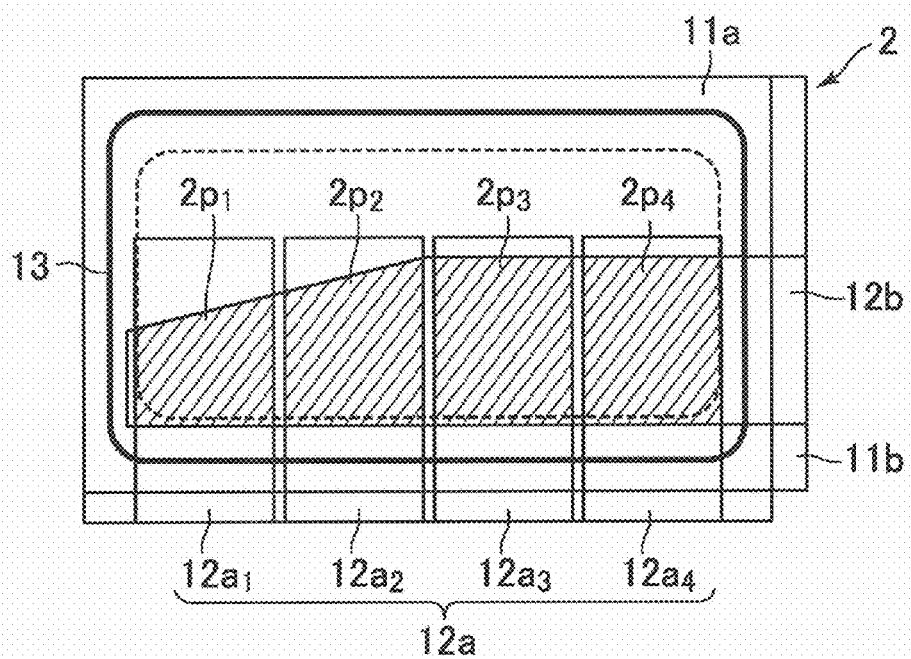
FIG. 5B is a schematic plan view illustrating an incident range of light incident to the electrodeposition device 2.

FIG. 5B illustrates an incident range of the light incident to the electrodeposition device 2. The horizontal direction in FIG. 5B is a direction parallel to the vertical direction of the paper surface in FIG. 5A. An inner side of a region enclosed in a dotted line in the drawing, that is, a certain region on the inner side along the pattern of the sealing section 13 is irradiated with the light beam emitted from the light-emitting unit 1. A light beam incident to a position other than the pixels $2p_1$ to $2p_4$ is transmitted through the electrodeposition device 2. Therefore, a light beam incident to a position where the pixels $2p_1$ to $2p_4$ are not formed and to the pixels $2p_1$ to $2p_4$ in the transparent state in the electrodeposition device 2 becomes a transmitted beam of the electrodeposition device 2.

The electrodeposition device 2 is disposed such that the light beam emitted from the light-emitting unit 1 is incident from the segment electrodes $12a_1$ to $12a_4$ side (on the substrate side on which silver is precipitated). The device may be disposed such that the light beam is incident from the common electrode 12b side (on the substrate side on which silver is not precipitated). When the light beam is incident from the segment electrodes $12a_1$ to $12a_4$ side, it is possible to obtain high optical reflectance in the electrodeposition device 2.

Figure 6A:
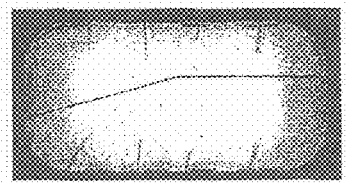
FIGS. 6A to 6C are photographs taken by observing a light-emitting unit 1 from a light-emitting surface side of the electrodeposition device 2.
Figure 6B:
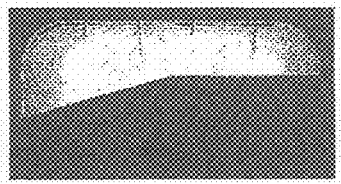
Figure 6C:
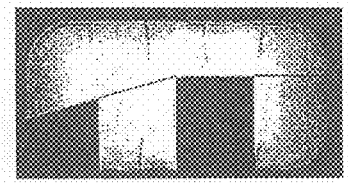

FIGS. 6A to 6C are photographs taken by observing the light-emitting unit 1 from a light-emitting surface side of the electrodeposition device 2. The photographs illustrated in the drawing are taken from the lighting fixture according to Example 1 with the reflective plate 3 and the projector lens 4 removed.

FIG. 6A illustrates a case in which the electrodeposition device 2 is completely turned OFF (all the pixels $2p_1$ to $2p_4$ in the transparent state). The entirety of light beams emitted from the light-emitting unit 1 are transmitted through the electrodeposition device 2.

FIG. 6B illustrates a case in which the electrodeposition device 2 is completely turned ON (all the pixels $2p_1$ to $2p_4$ in the mirror state). The light beam incident to a position of the pixels $2p_1$ to $2p_4$ of the electrodeposition device 2 is not transmitted therethrough (reflected).

FIG. 6C illustrates a case in which the electrodeposition device 2 is partially turned ON (in the example illustrated in the drawing, the pixels $2p_1$ and $2p_3$ in the mirror state). The light beam incident to the pixel position (pixels $2p_1$ and $2p_3$) of the electrodeposition device 2 is not transmitted therethrough (reflected).

As illustrated in photographs in FIGS. 6A to 6C, the electrodeposition device 2 is disposed on the optical path of the light beam emitted from the light-emitting unit 1 and the states (transparent state/mirror state) of the pixels $2p_1$ to $2p_4$ are controlled. Then, it is possible to control the light beam that is emitted from the electrodeposition device 2.

FIG. 5A is referred to. The light beam emitted from the light source 1 and transmitted through the electrodeposition device 2 is incident to the projector lens 4, is transmitted therethrough, and then is emitted ahead of a vehicle (right direction in the drawing) as an illumination beam (low beam and high beam). The projector lens 4 projects an inverted image of the position of the electrodeposition device 2. Therefore, the light beam transmitted through the electrodeposition device 2 and incident to a low beam emitting section 4a (in FIG. 5A, upper half of the lens 4) of the projector lens 4 is emitted from the projector lens 4 as the low beam. In addition, the light beam transmitted through the electrodeposition device 2 and incident to a high beam emitting section 4b (in FIG. 5A, lower half of the lens 4) of the projector lens 4 is emitted from the projector lens 4 as the high beam. The light beam incident to the position of the pixels $2p_1$ to $2p_4$ (pixels $2p_1$ to $2p_4$ in the transparent state) of the electrodeposition device 2 and transmitted therethrough is incident to the high beam emitting section 4b and is emitted from the projector lens 4 as the high beam. Since the projector lens 4 projects an inverted image of the position (pixel formation position) of the electrodeposition device 2, it is desirable that four pixels $2p_1$ to $2p_4$ are fit in at least a size of a focal portion of the projector lens 4.

The light beam emitted from the light source 1 and reflected from the pixels $2p_1$ to $2p_4$ in the mirror state in the electrodeposition device 2 is again reflected from the reflective plate 3. The reflective plate 3 is a flat mirror that is disposed so as to face the pixels $2p_1$ to $2p_4$ of the electrodeposition device 2, for example, below the light-emitting unit 1. The light beam reflected from the reflective plate 3 is emitted from a region other than the pixels $2p_1$ to $2p_4$ in the mirror state in the electrodeposition device 2, for example, a position where the pixels $2p_1$ to $2p_4$ are not formed (transparent region), and the light-emitting unit 1 as an example, is incident to a position where the pixels $2p_1$ to $2p_4$ are not formed in the incident range (refer to FIG. 5B) of the light beam incident to the electrodeposition device 2, and transmitted through the position. The transmitted beam is incident to, for example, the low beam emitting section 4a of the projector lens 4 and is emitted ahead of the vehicle as the low beam. FIG. 5A shows a traveling direction of the light beam incident to the pixels $2p_1$ to $2p_4$ in the mirror state in the electrodeposition device 2 in an arrow.

It is possible to achieve high illuminance of the low beam as much as the beam reflected from the pixels $2p_1$ to $2p_4$ in the mirror state is again reflected from the reflective plate 3 and is used as the low beam. Highly safe driving is realized and high light use efficiency of the light beam emitted from the light-emitting unit 1 is achieved.

An arrangement position (position of the pixels $2p_1$ to $2p_4$) of the electrodeposition device 2 corresponds to a shade arrangement position in the vehicle headlight in which, for example, a shade is used. The shade includes a beam shielding section of a predetermined shape (cut-off pattern) and forms the cut-off pattern (cut-off line) of the illumination beam that is emitted from the projector lens. In the lighting fixture according to Example 1, for example, a cut-off pattern is formed using an upper outline of the pixels $2p_1$ to $2p_4$ in FIG. 5B. That is, the common electrode $12b$ is a cut-off shaped pattern electrode.

In the lighting fixture according to Example 1, multiple beam distribution patterns are formed by the illumination beam (low beam and high beam) emitted from the projector lens 4 (low beam emitting section $4a$ and high beam emitting section $4b$).

Figure 7A:
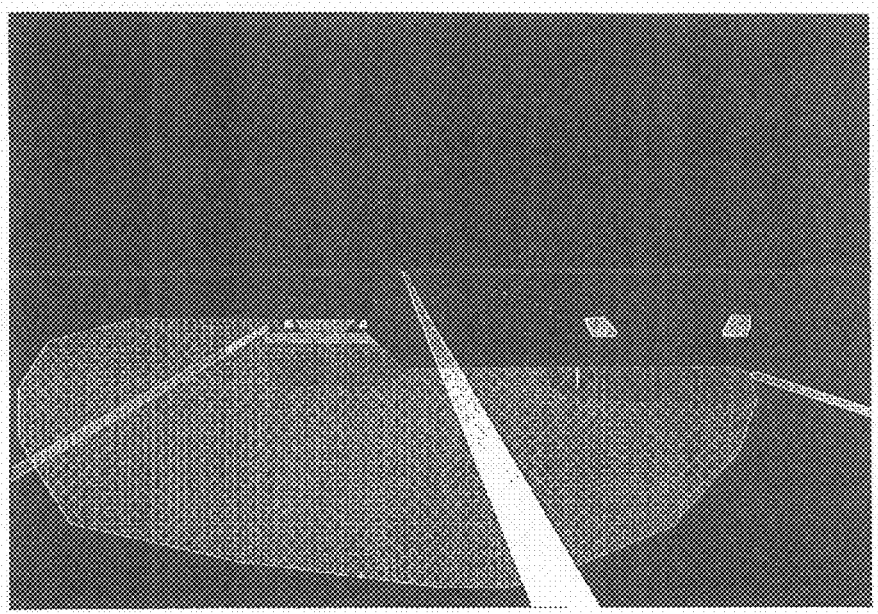
FIG. 7A and FIG. 7B are schematic views illustrating examples of a beam distribution pattern obtained using the lighting fixture according to Example 1.
Figure 7B:
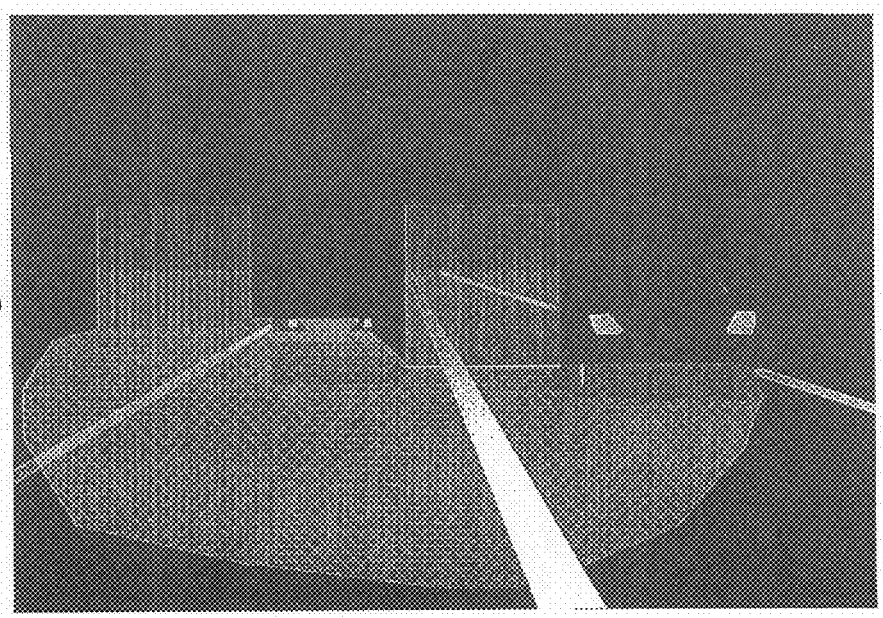

FIG. 7A and FIG. 7B illustrate examples of the beam distribution pattern obtained using the lighting fixture (vehicle headlight) according to Example 1. FIG. 7A and FIG. 7B schematically illustrate a vehicle state and the beam distribution pattern (projection state) of the headlight which are visually recognized by a driver of an automobile.

FIG. 7A is the beam distribution pattern obtained when the entirety of pixels of the electrodeposition device 2 are in the mirror state (entirely ON). When the entirety of pixels $2p_1$ to $2p_4$ are in the mirror state, the beam reflected from the pixels $2p_1$ to $2p_4$ and again reflected from the reflective plate 3 is again incident to the electrodeposition device 2, is transmitted therethrough, and is incident to the low beam emitting section $4a$ of the projector lens 4. After being emitted from the light-emitting unit 1, the beam is emitted as the low beam together with, for example, the beam transmitted through a position other than the pixels $2p_1$ to $2p_4$ of the electrodeposition device 2 and incident to the low beam emitting section $4a$ of the projector lens 4. The beam distribution region illustrated in the drawing is brighter than a case in which the beam incident to the pixels $2p_1$ to $2p_4$ in the mirror state is not reused.

FIG. 7B is the beam distribution pattern obtained when a part of the pixels are in the transparent state and the rest of the pixels are in the mirror state in the electrodeposition device 2. Specifically, the pixels $2p_1$ and $2p_3$ are in the transparent state and the pixels $2p_2$ and $2p_4$ are in the mirror state.

The beam incident to the pixels $2p_1$ and $2p_3$ in the transparent state is incident to the high beam emitting section $4b$ of the projector lens 4 and is emitted as a high beam. The beam incident to the pixels $2p_2$ and $2p_4$ in the mirror state is reflected from the pixels $2p_2$ and $2p_4$, is again reflected from the reflective plate 3, is again incident to the electrodeposition device 2, is transmitted therethrough, and, for example, is incident to the low beam emitting section $4a$ of the projector lens 4. After being emitted from the light-emitting unit 1, the beam is emitted as the low beam together with, for example, the beam transmitted through the position other than the pixels $2p_1$ to $2p_4$ of the electrodeposition device 2 and incident to the low beam emitting section $4a$ of the projector lens 4. Bright low beam distribution is obtained even in a case where the beam incident to the pixels $2p_2$ and $2p_4$ in the mirror state is not reused.

The beam distribution pattern in FIG. 7B is obtained by superimposing a region (beam distribution region), which is illuminated by the beam transmitted through the pixels $2p_1$ and $2p_3$ as the illumination beam, to the beam distribution pattern in FIG. 7A. The position and shape of the pixels $2p_1$ to $2p_4$ in the transparent state are reflected to the superimposed beam distribution region. That is, in the lighting fixture according to Example 1, at least a part of the illumination beam emitted from the high beam emitting section $4b$ of the projector lens 4 illuminates the region of the position and shape corresponding to the pixels $2p_1$ to $2p_4$ in the transparent state. The illumination beam emitted from the low beam optical system illuminates a certain region. This is because, for example, the beam emitted from the light-emitting unit 1 illuminates a certain region of the electrodeposition device 2, the beam incident to the position of the pixels $2p_1$ to $2p_4$ and transmitted therethrough is incident to the high beam emitting section $4b$, and the projector lens 4 projects an image of a position of the electrodeposition device 2. The lighting fixture according to Example 1 changes the pixels $2p_1$ to $2p_4$ (voltage applying state to the segment electrodes $12a_1$ to $12a_4$) which become a transmission region and thus, it is possible to change the beam distribution region (projection image pattern) of the high beam.

The superimposed beam distribution region (voltage applying state to the segment electrodes $12a_1$ to $12a_4$) may be determined depending on, for example, a vehicle state such as a position of a vehicle ahead or an oncoming vehicle. In the example illustrated in FIG. 7B, the pixels $2p_1$ and $2p_3$ which become the transmission region are selected such that a far region of a position where there is no vehicle ahead or oncoming is illuminated. The beam distribution pattern in FIG. 7B makes it possible to check, for example, a state of a far region in a forward direction or a state of the roadside. This is an example of a beam distribution pattern by which a good field of vision is secured, high safety of driving is achieved, and a state in which a driver of the vehicle ahead or oncoming is not blinded is realized.

The determination of the superimposed beam distribution region (selection of the pixels $2p_1$ to $2p_4$ which become the transmission region) is performed by, for example, a driver. A sensor that detects a position of a vehicle ahead or oncoming is mounted in the vehicle, a control device is used, which electrically controls the pixel state (transparent state/mirror state) of the electrodeposition device 2 using the information obtained by the sensor, and thereby, automatic beam distribution control may be performed. In this case, it is possible to regularly obtain the beam distribution state in which high safety is realized.

The lighting fixture according to Example 1 is an adaptive driving beam (ADB) that can form a beam distribution pattern depending on, for example, a vehicle state and that has high beam distribution controllability. The beam emitted from the light-emitting unit 1 is, for example, basically transmitted through the electrodeposition device 2 and is emitted as the illumination beam. In addition, the voltage applying state to the electrodeposition device 2 is controlled such that only the position of the pixels $2p_1$ to $2p_4$ corresponding to a position of a vehicle ahead or oncoming (position which is not appropriate to be illuminated) enters into the mirror state. The beam reflected from the pixels $2p_1$ to $2p_4$ in the mirror state is again incident to the electrodeposition device 2, is transmitted therethrough, and is, for example, reused as the low beam. Since the beam reflected from the pixels $2p_1$ to $2p_4$ in the mirror state is reused, for example, high illuminance of the low beam is achieved and high light use efficiency of the beam emitted from the light-emitting unit 1 is achieved. The lighting fixture according to Example 1 realizes high safety for all drivers of a self-driven vehicle, a vehicle ahead, and an oncoming vehicle.

Further, it is possible to realize the ADB without using a moving section (mechanical means) and therefore, it is possible to achieve, for example, miniaturization, thinness, or weight reduction. In addition, it is possible to realize the ADB that has high vibration resistance and high reliability with a low cost.

As described above with reference to FIG. 4A and FIG. 4B, both the transmittance when no voltage is applied and the transmittance when a voltage is applied to the electrodeposition device 2 are 80% or more. Therefore, even in this point of view, the lighting fixture according to Example 1 has high light use efficiency of the beam emitted from the light-emitting unit 1.

Figure 8:
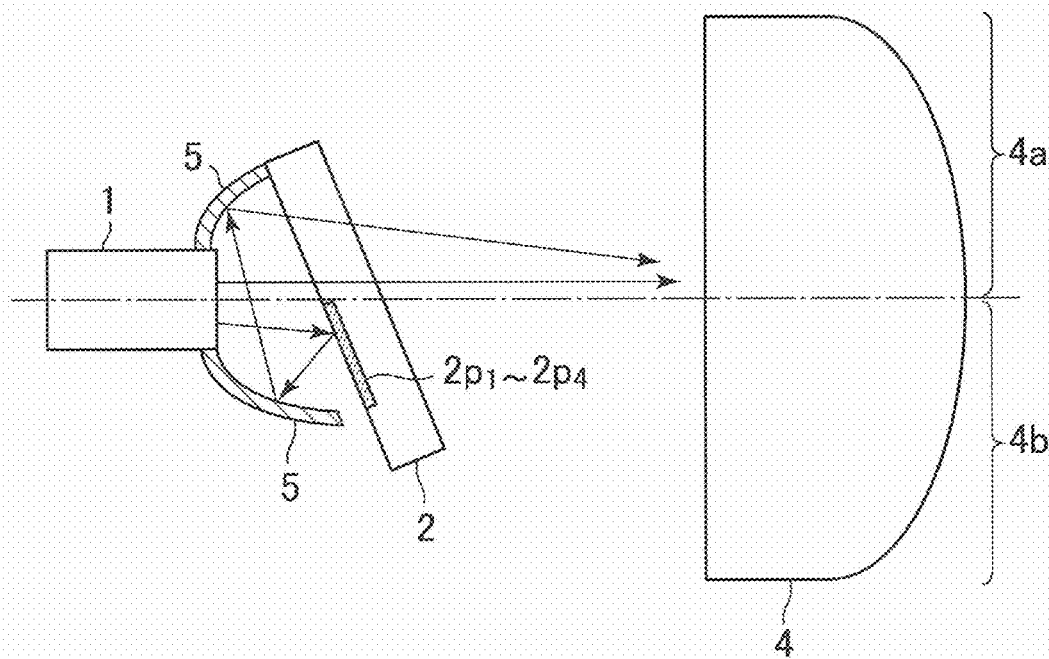
FIG. 8 is a schematic view illustrating a lighting fixture according to Example 2.

FIG. 8 is a schematic view illustrating the lighting fixture (vehicle headlight) according to Example 2. According to Example 2, the electrodeposition device 2 is disposed such that an angle between a normal direction of the surface of the pixels $2p_1$ to $2p_4$ (electrode surface and substrate surface) and an optical axis direction of the incident beam becomes greater than that in the Example 1, and specifically, becomes 20° or more. In addition, In the Example 1, the beam reflected from the pixels $2p_1$ to $2p_4$ in the mirror state in the electrodeposition device 2, is reflected from the reflective plate 3 only once, and is again incident to the electrodeposition device 2. However, in the Example 2, the beam is reflected multiple times and is incident to the electrodeposition device 2. Specifically, the reflected beam from the pixels $2p_1$ to $2p_4$ in the mirror state is reflected from a lower region of a bowl-shaped reflective member 5 disposed facing the pixels $2p_1$ to $2p_4$, is again reflected from an upper region of the reflective member 5, and is again incident to the electrodeposition device 2. The other configurations or the like are the same as in the Example 1.

The lighting fixture according to Example 2 achieves the same effects as that according to Example 1. Further, miniaturization is realized compared to Example 1.

According to Example 2, reflection is performed at different two regions of one reflective member 5; however, after reflection is performed from a first reflective member disposed facing the pixels $2p_1$ to $2p_4$, may be performed from a second reflective member different from the first reflective member and may be again incident to the electrodeposition device 2.

Figure 9A:
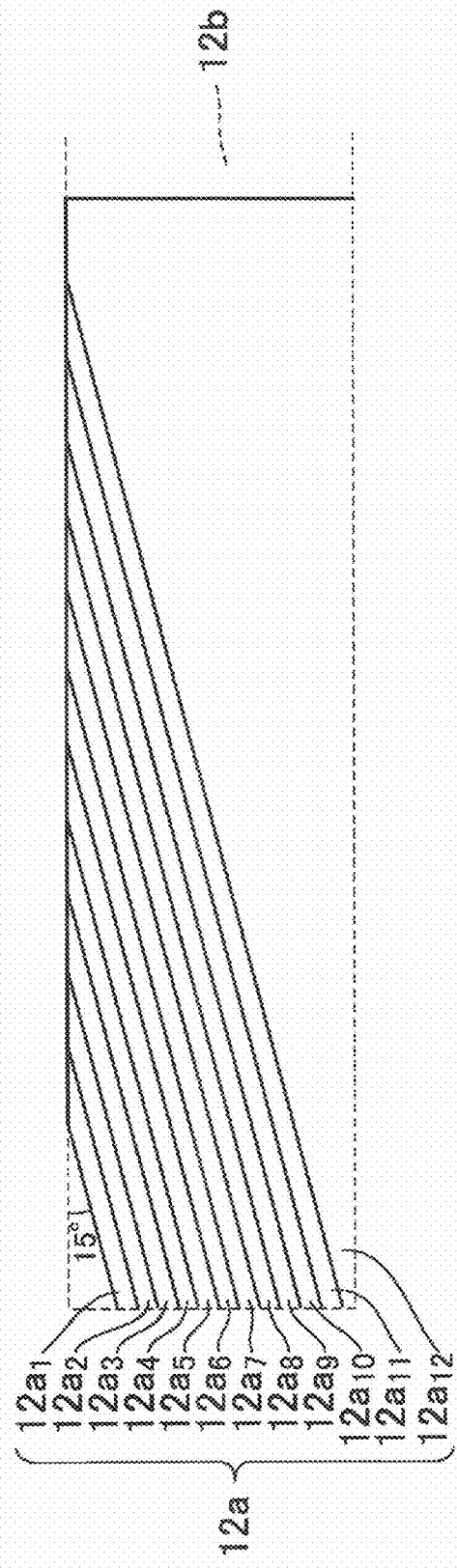
FIG. 9A is a schematic plan view illustrating an upper transparent electrode 12a and a lower transparent electrode 12b of the electrodeposition device 2 which is used in a lighting fixture according to Example 3 and FIG. 9B is a schematic view illustrating the light-emitting unit 1 of the lighting fixture according to Example 3.

FIG. 9A is a schematic plan view illustrating the upper transparent electrode (segment electrode) 12a and the lower transparent electrode (common electrode) 12b of the electrodeposition device 2 which is used in a lighting fixture according to Example 3.

The upper transparent electrodes 12a depicted in solid lines are formed of transparent electrodes $12a_1$ to $12a_{12}$ which are electrically independent from each other. In addition, a lower transparent electrode 12b depicted in dotted lines is patterned into a rectangular shape. The upper transparent electrodes $12a_1$ to $12a_{11}$ are arranged so as to be inclined, for example, by 15° with respect to a long side of the rectangle of the lower transparent electrode 12b. In addition, the upper transparent electrode $12a_{12}$ is formed so as to cover a right-side region of the upper transparent electrode $12a_{11}$, for example, illustrated in FIG. 9A. The other configurations of the electrodeposition device 2 are the same as in the Example 1.

Figure 9B:
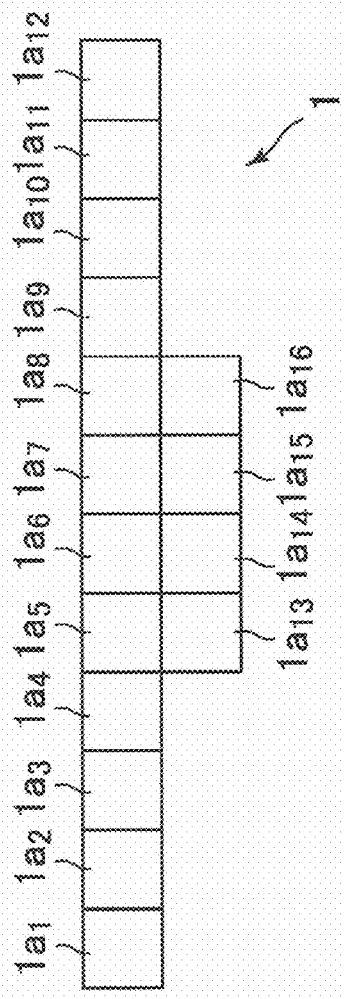

FIG. 9B is a schematic view illustrating the light-emitting unit 1 of the lighting fixture according to Example 3. In the lighting fixture according to Example 3, the light-emitting unit 1 is configured to include multiple LEDs $1a_1$ to $1a_{16}$ as an LED array and the multiple LEDs $1a_1$ to $1a_{16}$ is arranged in two stages. In the first stage, the LEDs $1a_1$ to $1a_{12}$ are arranged and, in the second state, LEDs $1a_{13}$ to $1a_{16}$ are arranged adjacent to LEDs $1a_5$ to $1a_8$.

The lighting fixture according to Example 3 has the same configuration as that according to Example 1 except the light-emitting unit 1 and the electrodeposition device 2. As described below, a state of control is different from that in Example 1.

FIG. 10 is a partial plan view schematically illustrating the electrodeposition device 2 that is used in the lighting fixture according to Example 3. The pixels $2p_1$ to $2p_{12}$ are demarcated in a region in which the upper transparent electrodes $12a_1$ to $12a_{12}$ and the upper transparent electrode 12b are overlapped when viewed in a normal direction of the substrates 10a and 10b. In the drawing, the LED array (LEDs $1a_1$ to $1a_{16}$) in FIG. 9B is arranged to correspond to the pixels $2p_1$ to $2p_{12}$.

A region A is a region corresponding to a position of forming the pixel $2p_{12}$. In addition, a region B is a region corresponding to a position of forming the pixels $2p_1$ to $2p_{11}$. The light beam emitted from the light-emitting unit 1 and incident to the regions A and B is transmitted through or reflected from the electrodeposition device 2 depending on a state (transparent state/mirror state) of the pixels $2p_1$ to $2p_{12}$. The light beam transmitted through the electrodeposition device 2 is incident to the projector lens 4 and emitted as the illumination beam. The light beam reflected from the electrodeposition device 2 is again reflected from the reflective plate 3, is again incident to the electrodeposition device 2, is transmitted therethrough, and is incident to the projector lens 4. After the light beam is emitted from the light-emitting unit 1, the light beam is transmitted through, for example, a position other than the position of the pixels $2p_1$ to $2p_{12}$ of the electrodeposition device 2 and is emitted as the illumination beam together with the beam incident to the projector lens 4 (refer to FIG. 5A).

A region C is a region corresponding to a position where the pixels $2p_1$ to $2p_{12}$ are not formed. The light beam emitted from the light-emitting unit 1 and incident to the region C is transmitted through the electrodeposition device 2, is incident to the projector lens 4, and is emitted as the illumination beam.

In the lighting fixture according to Example 3, for example, a cut-off pattern is formed using an upper outline of the pixels $2p_1$ to $2p_{12}$ (a part of the light beam emitted from the light-emitting unit 1 being reflected from the pixels $2p_1$ to $2p_{12}$ in the mirror state). That is, the upper transparent electrodes (segment electrodes) $12a_1$ to $12a_{12}$ become cut-off shaped pattern electrodes. In addition, the electrodeposition device 2 can adjust transmitted light volume and reflected light volume by a voltage value that is applied.

In the lighting fixture according to Example 3, driving beam distribution and passing beam distribution are obtained due to a voltage applying state to the electrodeposition device 2. The driving beam distribution is a beam distribution pattern which illuminates a relatively far region and the passing beam distribution illuminates a relatively close region and for example, a beam distribution pattern which is desirable to be applied when there is an oncoming vehicle. In addition, in the lighting fixture according to Example 3, for example, during the passing beam distribution, the control is linked to the steering operation and then, the beam distribution pattern is varied depending on an angle of the steering (Adaptive Front-lighting System (AFS)).

For example, the region A is controlled such that, during the driving beam distribution, the optical transmittance as the transparent state becomes about 90% and, during the passing beam distribution, the optical transmittance as the mirror state becomes about 10%. The control is performed using a control device by changing the voltage value applied to the pixel $2p_{12}$ (the upper transparent electrode $12a_{12}$).

The region B is controlled such that, during the driving beam distribution, the optical transmittance as the transparent state becomes about 90% and, during the passing beam distribution, for example, a part of the pixels enter into the transparent state (the optical transmittance becomes about 90%) and the rest of the pixels enter into the mirror state (the optical transmittance becomes about 10%). The control is performed using the control device by changing the voltage value applied to the pixels $2p_1$ to $2p_{11}$ (the upper transparent electrodes $12a_1$ to $12a_{11}$). During the passing beam distribution, the voltage values applied to the pixels $2p_1$ to $2p_{11}$ are controlled and thereby, the cut-off pattern is changed in the electrodeposition device 2. The applied voltage values are controlled such that the pixel states sequentially switch to the mirror state in a direction from the pixel $2p_{11}$ to the pixel $2p_1$ based on an AFS function, in accordance with the steering angle. The pixel state (transparent state/mirror state) is changed depending on the steering angle and thereby, the beam distribution region of the passing beam distribution varies.

A beam incident to the region C is transmitted through the electrodeposition device 2 and the projector lens 4 and is emitted as the illumination beam during both the driving beam distribution and the passing beam distribution.

In the lighting fixture according to Example 3, control of synchronizing the state (transparent state/mirror state) of the pixels $2p_1$ to $2p_{12}$ and the beam-emitting state (beam emitting/no-beam emitting of each of the LEDs $1a_1$ to $1a_{16}$) of the light-emitting unit 1 is performed.

For example, the control device controls such that the LEDs $1a_{13}$ to $1a_{16}$ emit light beams during the driving beam distribution and do not emit during the passing beam distribution. In addition, the control is performed such that the LEDs $1a_5$ to $1a_8$ emit light beams during the driving beam distribution and the LEDs $1a_1$ to $1a_4$ and $1a_9$ to $1a_{12}$ do not emit during the driving beam distribution. During the passing beam distribution, four of the LEDs $1a_1$ to $1a_{12}$ perform light beam emitting depending on the pixel state.

The pixel states during the driving beam distribution and the passing beam distribution and the beam-emitting state of the light-emitting unit 1 are described with respect to FIG. 11 to FIG. 14B.

FIG. 11 illustrates the pixel state during driving beam distribution and a beam-emitting state of the light-emitting unit 1. During the driving beam distribution, the entirety of pixels $2p_1$ to $2p_{12}$ in the region A and the region B enter into the transparent state. In addition, in the light-emitting unit 1, light beam emitting is performed from the LEDs $1a_5$ to $1a_8$ and $1a_{13}$ to $1a_{16}$. The emitted LEDs $1a_5$ to $1a_8$ and $1a_{13}$ to $1a_{16}$ are enclosed by a heavy line.

The beam incident to the electrodeposition device 2 is transmitted through all the region A to region C, is incident to the projector lens 4, and is emitted from the projector lens 4 as the illumination beam.

Figure 12A:
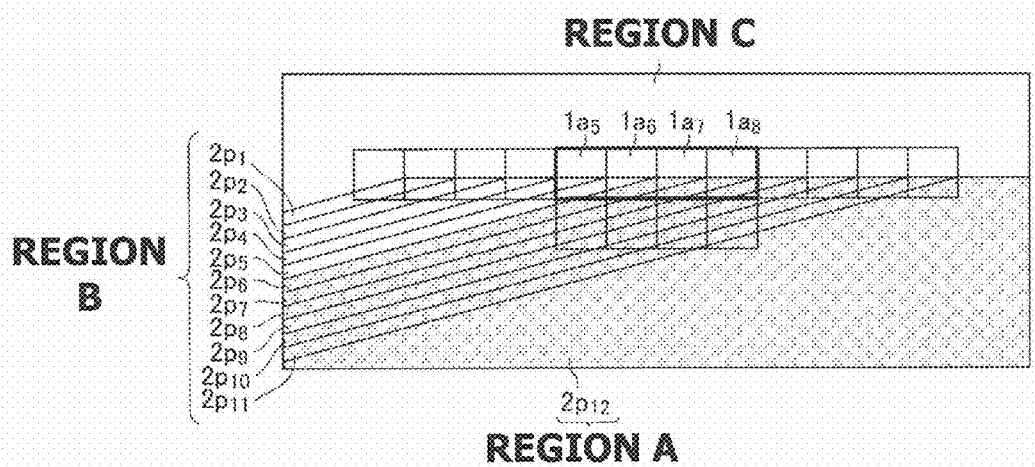
FIG. 12A is a schematic plan view illustrating a pixel state in which passing beam distribution is formed while straight-ahead driving and a beam-emitting state of the light-emitting unit 1 and FIG. 12B is a schematic view illustrating a passing beam distribution pattern during the straight-ahead driving.

FIG. 12A is a schematic plan view illustrating a pixel state in which the passing beam distribution is formed during straight-ahead driving and the beam-emitting state of the light-emitting unit 1. In the forming of the passing beam distribution during the straight-ahead driving, the pixels $2p_1$ to $2p_5$ (a part of pixels in region B) enter into the transparent state and the pixels $2p_6$ to $2p_{12}$ (the rest of the pixels in the region A and the region B) enter into the mirror state. In addition, in the light-emitting unit 1, the light beam emitting is performed from the LEDs $1a_5$ to $1a_8$.

The beam incident to a transparent state position (position of the pixels $2p_1$ to $2p_5$ of the region B and the region C) of the electrodeposition device 2 is transmitted therethrough, is incident to the projector lens 4, and is emitted from the projector lens 4 as the illumination beam.

After the beam incident to a reflection state position (position of the region A and the pixels $2p_6$ to $2p_{11}$ of the region B) of the electrodeposition device 2 is reflected and is again reflected from the reflective plate 3, the beam is transmitted through the transparent state position of the electrodeposition device 2, for example, the region C, is incident to the projector lens 4, and is emitted from the projector lens 4 as the illumination beam, for example, the low beam.

Figure 12B:
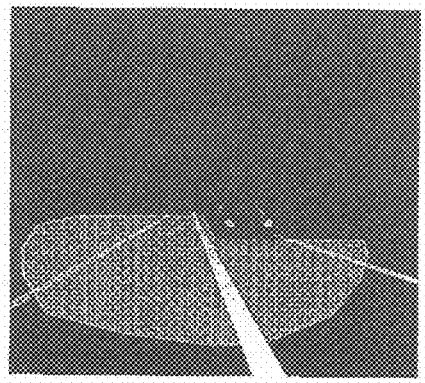

FIG. 12B illustrates a passing beam distribution pattern during the straight-ahead driving. The beam distribution pattern illustrated in the drawing is obtained by the illumination beam which is emitted from the projector lens 4. The beam distribution pattern illustrated in the drawing corresponds to, for example, the beam distribution pattern in FIG. 7A in the Example 1.

Figure 13A:
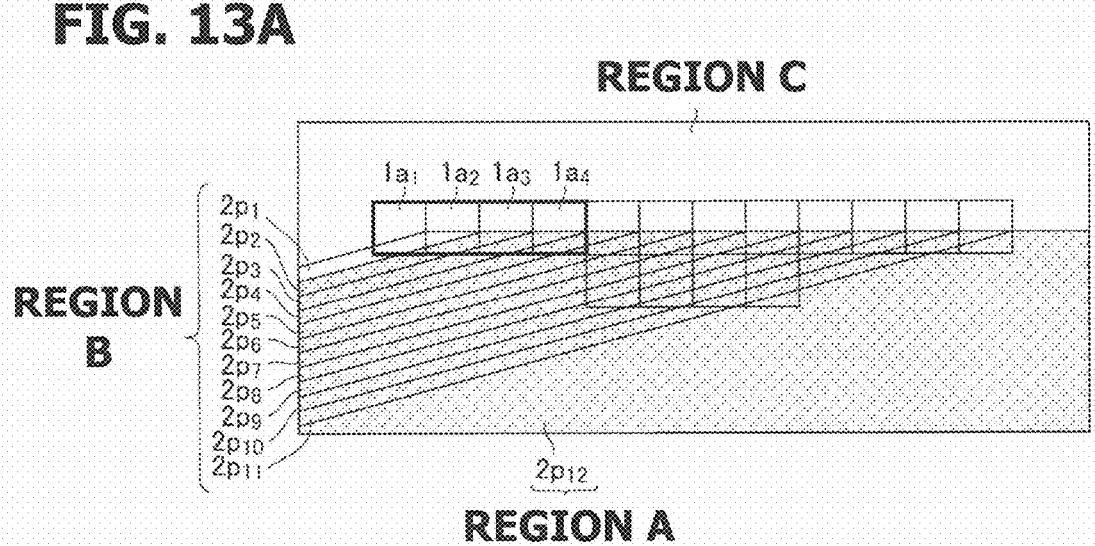
FIG. 13A is a schematic plan view illustrating a pixel state in which the passing beam distribution is formed in a case where a steering wheel is turned to the left, for example, during left cornering and a beam-emitting state of the light-emitting unit 1

FIG. 13A is a schematic plan view illustrating the pixel state in which the passing beam distribution is formed in a case where a steering wheel is turned to the left, for example, during left cornering and the beam-emitting state of the light-emitting unit 1. In a case where the steering wheel is turned to the left, the number of the pixels in the mirror state in the region B becomes greater in a direction toward the pixel $2p_1$ than in the case of the straight-ahead driving (refer to FIG. 12A) and the LEDs sequentially emit light beams in the same direction (direction of the LED $1a_1$). In the example illustrated in FIG. 13A, the pixel $2p_1$ enters into the transparent state and the pixels $2p_2$ to $2p_{12}$ enter into the mirror state. In addition, the light beam emitting is performed from the LEDs $1a_1$ to $1a_4$.

Figure 13B:
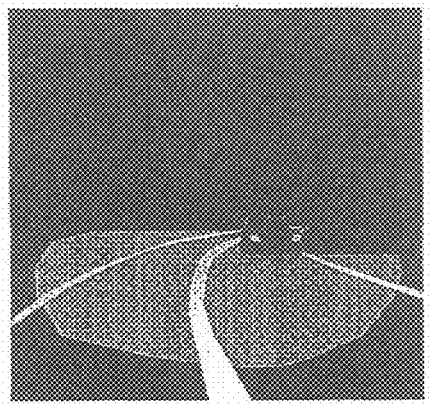
FIG. 13B is a schematic view illustrating a passing beam distribution pattern in a case where the steering wheel is turned to the left.

FIG. 13B illustrates a passing beam distribution pattern in a case where the steering wheel is turned to the left. The beam distribution pattern illustrated in the drawing is obtained by the illumination beam emitted from the projector lens 4. The reflective region of the electrodeposition device 2 becomes broader in the direction toward the pixel $2p_1$, the LEDs emit light beams in the same direction, and thereby, the illumination beam swings and is emitted in the left along the traveling direction of the automobile.

Figure 14A:
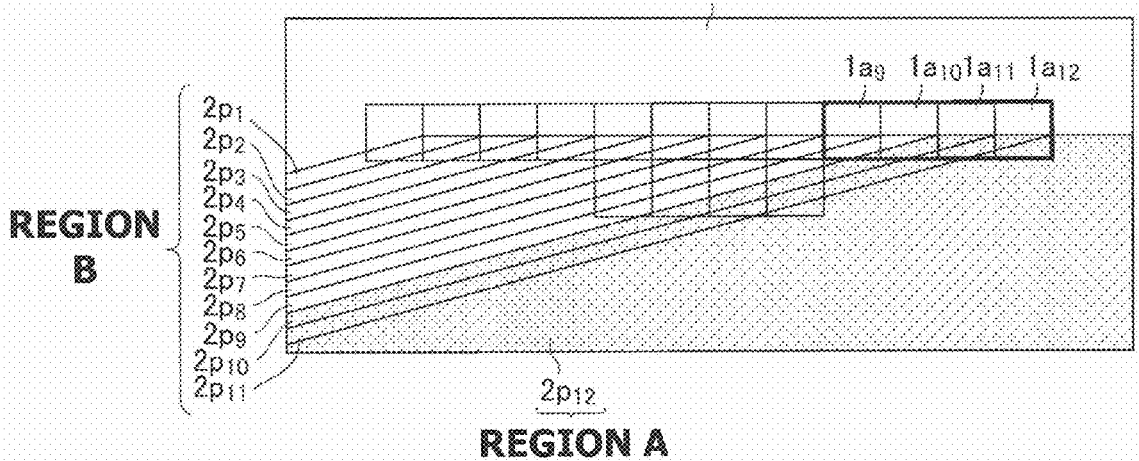
FIG. 14A is a schematic plan view illustrating a pixel state in which the passing beam distribution is formed in a case where the steering wheel is turned to the right, for example, during right cornering and a beam-emitting state of the light-emitting unit 1

FIG. 14A is a schematic plan view illustrating a pixel state in which passing beam distribution is formed in a case where the steering wheel is turned to the right, for example, during right cornering and a beam-emitting state of the light-emitting unit 1. In a case where the steering wheel is turned to the right, the number of the pixels in the transparent state in the region B becomes greater in a direction toward the pixel $2p_{11}$ than in the case of the straight-ahead driving (refer to FIG. 12A) and the LEDs sequentially emit light beams in the same direction (direction of the LED $1a_{12}$). In the example illustrated in FIG. 14A, the pixels $2p_1$ to $2p_9$ enter into the transparent state and the pixels $2p_{10}$ to $2p_{12}$ enter into the mirror state. In addition, the light beam emitting is performed from the LEDs $1a_9$ to $1a_{12}$.

Figure 14B:
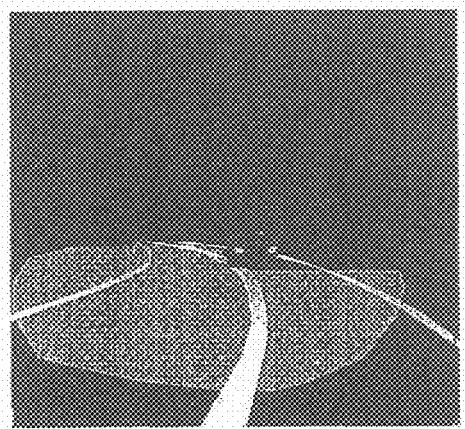
FIG. 14B is a schematic view illustrating a passing beam distribution pattern in a case where the steering wheel is turned to the right.

FIG. 14B illustrates a passing beam distribution pattern in a case where the steering wheel is turned to the right. The beam distribution pattern illustrated in the drawing is obtained by the illumination beam emitted from the projector lens 4. The transmission region of the electrodeposition device 2 becomes broader in the direction toward the pixel $2p_{11}$, the LEDs emit light beams in the same direction, and thereby, the illumination beam swings to the left and is emitted in the traveling direction of the automobile.

As above, in the lighting fixture according to Example 3, the states of the pixels $2p_1$ to $2p_{11}$ in the region B are sequentially switched to the mirror state in the direction toward the pixel $2p_1$ or are sequentially switched to the transparent state in the direction toward the pixel $2p_{11}$. Concurrently, the LEDs $1a_1$ to $1a_{12}$ emit light beams in a direction toward the LED $1a_1$ or in a direction toward the LED $1a_{12}$, and thereby the beam distribution pattern during the passing beam distribution swings depending on the steering angle. It is possible to perform the illumination not only that is clearly seen by the driver, but also that does not blind a driver on an oncoming vehicle.

In the lighting fixture according to Example 3, the light beam emitted from the light-emitting unit 1 and reflected from the pixels $2p_1$ to $2p_{12}$ in a mirror state is again reflected from the reflective plate 3, is again incident to the electrodeposition device 2, is transmitted therethrough, and is reused, for example, as the low beam. Therefore, the illuminance of the low beam is high. For example, in a case where a liquid crystal display device is used instead of the electrodeposition device 2, the optical transmittance of the device is low. Since the reflected beam is not reused, or the like, the illuminance of the illumination beam is low.

The lighting fixture according to Example 3 has high beam distribution controllability and is the ADB that realizes light use efficiency and high driving safety.

Figure 15A:
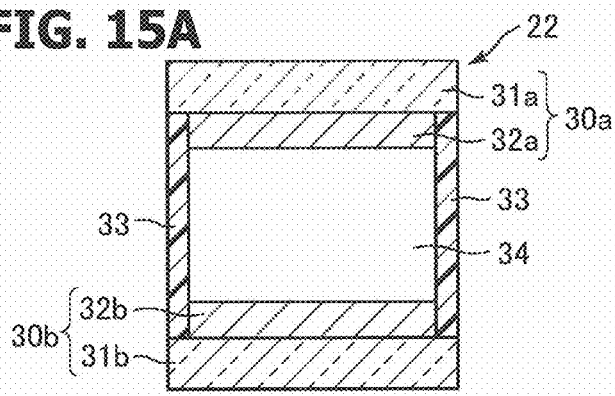
FIG. 15A is a schematic cross-sectional view illustrating an electrodeposition device 22.

FIG. 15A is a schematic cross-sectional view illustrating an electrodeposition device 22 that is used in the lighting fixture according to Examples 4 and 5.

The electrodeposition device 22 is configured to include an upper substrate (segment substrate) 30a and a lower substrate (common substrate) 30b which are arranged facing each other so as to be spaced, for example, substantially in parallel, and an electrolyte layer 34 disposed between both the substrates 30a and 30b.

The upper substrate 30a and the lower substrate 30b include an upper transparent substrate 31a and a lower transparent substrate 31b, respectively, and an upper transparent electrode (segment electrode) 32a and a lower transparent electrode (common electrode) 32b which are formed on the transparent substrates 31a and 31b, respectively. The transparent electrodes 32a and 32b have smooth surfaces. The upper transparent substrate 31a and the lower transparent substrate 31b are, for example, glass substrates and the upper transparent electrode 32a and the lower transparent electrode 32b are formed of, for example, ITO.

The electrolyte layer 34 is disposed in an inside region of a sealing section 33 between the upper substrate 30a and the lower substrate 30b and contains an electrodeposition material (for example, $AgNO_3$) containing silver.

Figure 15B:
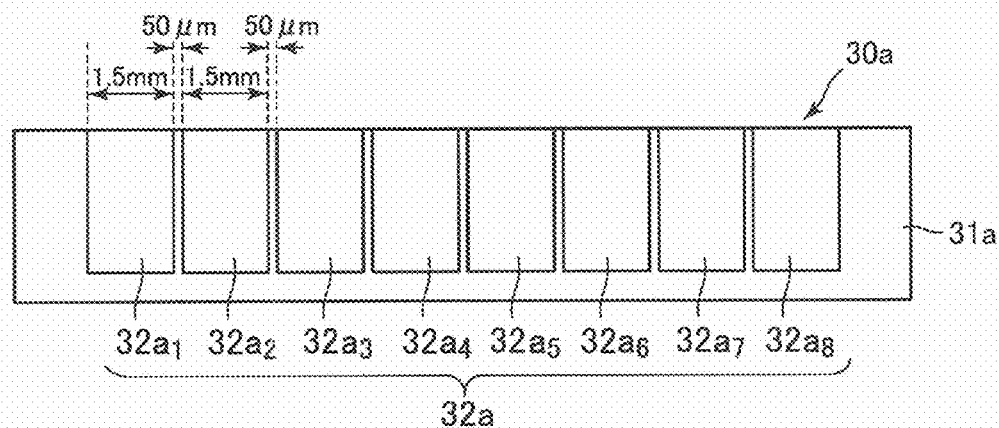
FIG. 15B is a schematic plan view of an upper substrate 30a, FIG. 15C is a schematic plan view of a lower substrate 30b.

FIG. 15B is a schematic plan view of the upper substrate 30a. The upper transparent electrode 32a is a patterning electrode formed on the upper transparent substrate 31a. The upper transparent electrode 32a is formed to have eight transparent electrodes $32a_1$ to $32a_8$ which are electrically independent from each other. An electrode width of each of the transparent electrodes $32a_1$ to $32a_8$ is, for example, 1.5 mm and a distance between each of the transparent electrodes $32a_1$ to $32a_8$ is, for example, 50 μm. The electrode width and the inter-electrode distance are not limited thereto.

Figure 15C:
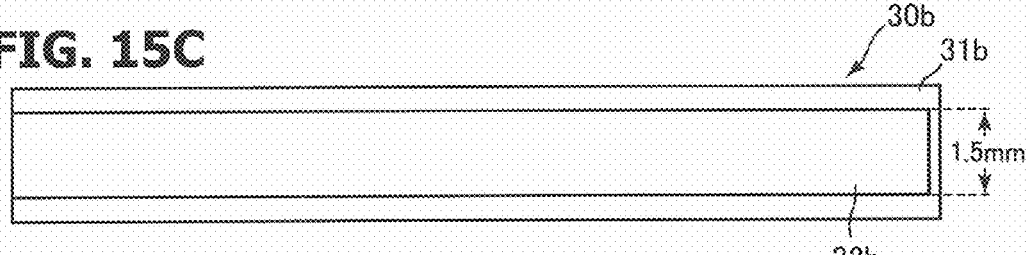
FIG. 15D is a schematic plan view of the electrodeposition device 22.

FIG. 15C is a schematic plan view of the lower substrate 30b. The lower transparent electrode 32b is formed on the lower transparent substrate 31b and has an electrode pattern that is elongated in a direction. For example, the electrode width is 1.5 mm.

Figure 15D:
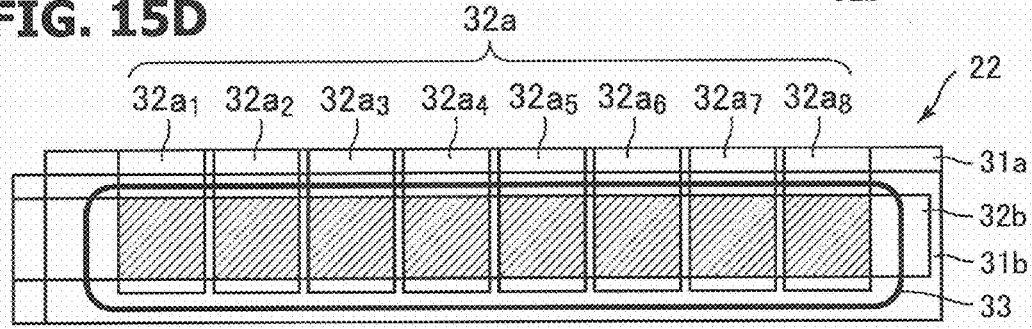

FIG. 15D is a schematic plan view of the electrodeposition device 22. Pixels are demarcated in a region in which the electrodes $32a_1$ to $32a_8$ and the electrode 32b are overlapped when viewed in a normal direction of the substrates 30a and 30b. In the drawing, the pixel is marked by diagonal lines. The electrodeposition device 22 includes eight pixels which are arranged in one direction at inter-electrode intervals of 50 μm. Each pixel has a square shape (dot-like) of 1.5 mm×1.5 mm. The pixels are arranged in the inside region of the sealing section 33.

In the electrodeposition device 22, a transparent state and a non-transparent state (mirror state) of each pixel are electrically switchable by a DC voltage applied to the electrodes 32a and 32b.

When no voltage is applied, a light beam incident to the electrodeposition device 22 is transmitted therethrough.

When a voltage is applied and, as an example, when the lower transparent electrode 32b is grounded and a DC voltage of −2.5 V is applied to the upper transparent electrode 32a, a silver ion contained in the electrolyte layer 34 is reduced, is converted into metal silver in the vicinity of the upper transparent electrode 32a (electrode on a negative voltage side), precipitated and deposited on the electrode 32a, and a thin silver film is formed. The thin silver film works as a mirror and regularly reflects a light beam incident to the electrodeposition device 22 (pixel). Although varying depending on an area, an employed material, or the like, of a pixel, it is possible to form a thin silver film by setting a potential difference of 1.5 V to 8 V between the upper transparent electrode 32a and the lower transparent electrode 32b.

The thin silver film disappears from the upper transparent electrode 32a by cutting OFF of the voltage (0 V or open state) or applying a reverse bias (for example, +1 V). When the reverse bias is applied, it is possible to cause the silver to rapidly disappear and for the electrodeposition device 22 to enter into the transparent state.

It is possible to use the electrodeposition device 22 as a mirror device that interchangeably realizes the transparent state and the mirror state (reflective state) of a pixel position by applying a DC voltage or no DC voltage.

It is possible to apply a voltage to the pixels (electrodes $32a_1$ to $32a_8$) of the electrodeposition device 22, independently. In the electrodeposition device 22, the transparent state and the mirror state are arbitrarily switchable at a pixel unit.

The electrodeposition device 22 is prepared, for example, as follows.

A pair of transparent electrode pattern attached glass substrates (substrates 30a and 30b) are prepared. A smooth transparent conductive film, for example, an ITO film is used as the transparent electrode on the glass substrate. It is possible to form the transparent conductive film by sputtering, CVD, vapor deposition, or the like. In addition, a reflective film such as a thin metal film (Al, Ag, or the like) a multi-layer chemical film may be formed on a part of one substrate by deposition, sputtering, CVD, plating, or the like. The reflective film may be formed on the same side as or on the opposite side (outer side of the cell) to the ITO film. It is desirable that the reflective film is formed by a pattern on a lower portion or the like of the eight square (dot-like) pixels in FIG. 15D. Examples of the pattern formation method include mask deposition (sputtering) using photolithography, an SUS mask, or the like, electroplating, or the like.

A pair of glass substrates are arranged such that the ITO films face each other and are converted into a cell. The subsequent processes after the forming of the cell are the same as those in the preparing method of the electrodeposition device 2 in Example 1.

The prepared electrodeposition device 22 is observed, and the device is substantially transparent in an initial state. Although the device looks slightly yellowish, it is thought that the color is from the color of $CuCl_2$ as the mediator. It is possible to obtain a colorless transparent electrolyte layer 34 by using a different material as the mediator or making the cell thin.

The inventor of the application measures optical characteristics (transmittance characteristics and reflectance characteristics) of the electrodeposition device 22 and the optical characteristics are the same as that of the electrodeposition device 2 of Example 1.

Figure 16A:
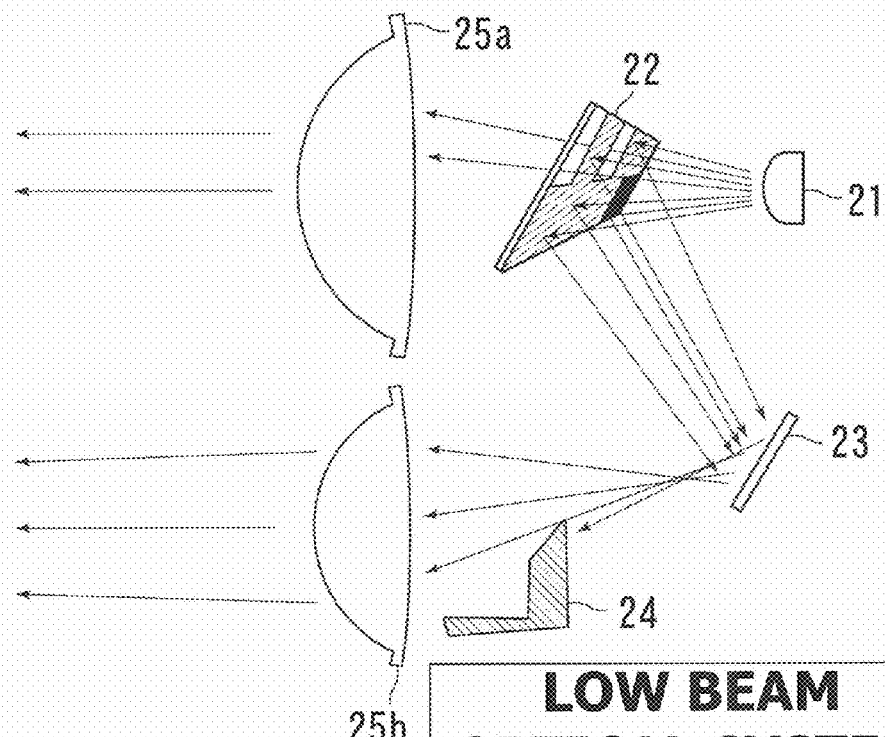
FIG. 16A is a schematic view illustrating a lighting fixture according to Example 4.

FIG. 16A is a schematic view illustrating the lighting fixture (vehicle headlight) according to Example 4. The lighting fixture according to Example 4 includes a light source 21, the electrodeposition device 22, a reflective plate 23, a shade 24, and projector lenses 25a and 25b. A low beam optical system is configured to include the reflective plate 23, the shade 24, and the projector lens 25b and a high beam optical system is configured to include the lens 25a. For example, an upward direction in the drawing corresponds to a perpendicularly upper side and a downward direction in the drawing corresponds to a perpendicularly lower side. In addition, the vertical front direction of the paper surface is the same direction as the left direction in FIG. 15D.

A light beam is emitted from a single light source 21. The optical axis direction of the emitted beam is, for example, a horizontal direction in the drawing. The light beam emitted from the light source 21 is incident to the electrodeposition device 22.

The electrodeposition device 22 includes eight square (dot-like) pixels which are arranged in a direction and the transparent state and the mirror state are arbitrarily switchable at a pixel unit (refer to FIG. 15D). Here, the electrodeposition device 22 includes eight square (dot-like) pixels on the upper side and a reflective surface vapor-deposited on the lower side. The electrodeposition device 22 is disposed such that the light beam emitted from the light source 21 is incident to the arrangement position of the eight pixels and a normal line of a surface of the pixels (electrode surface and substrate surface) is not parallel to an optical axis direction of the incident beam. The voltage applying states between the segment electrodes $32a_1$ to $32a_8$ and a common electrode $32b$ are varied, the transparent state and the mirror state are switched for each of the pixels independently, and transmission or reflection of the incident beam (forming of the transmitted beam or reflected beam) is performed at a pixel unit.

The electrodeposition device 22 is disposed such that the light beam emitted from the light source 21 is incident from the segment electrodes $32a_1$ to $32a_8$ side (on the substrate side on which silver is precipitated). The device may be disposed such that the light beam is incident from the common electrode $32b$ side (on the substrate side on which silver is not precipitated). When the light beam is incident from the segment electrodes $32a_1$ to $32a_8$ side, it is possible to obtain high optical reflectance in the electrodeposition device 22.

The beam transmitted through the pixel in the transparent state in the electrodeposition device 22 is it the high beam optical system and the beam reflected from the pixel in the mirror state is incident to the low beam optical system. The high beam optical system and the low beam optical system emit an illumination beam, respectively. Multiple beam distribution patterns are formed using the illumination beam emitted from both optical systems.

Specifically, the light beam emitted from the light source 21 and transmitted through the pixel in the transparent state in the electrodeposition device 22 is transmitted through the lens 25a, and then is emitted ahead of a vehicle (left direction in the drawing) as an illumination beam (high beam). The lens 25a projects an inverted image of the position (pixel formation position) of the electrodeposition device 22. Therefore, it is desirable that eight pixels are fit in at least a size of a focal portion of the lens 25a.

The light beam emitted from the light source 21 and reflected from the pixels in the mirror state and the vapor-deposited reflective surface in the electrodeposition device 22 is reflected from the reflective plate 23 which is a flat mirror that is disposed facing the pixels of the electrodeposition device 22. The pixels and vapor-deposited reflective surface of the electrodeposition device 22 are arranged so as to be inclined from the vertical direction of the optical axis of the light source 21 such that the reflected beam is deviated from the light source 21 and directs toward the reflective plate 23. The beam reflected from the reflective plate 23 is incident to the lens 25b, is transmitted therethrough, and is emitted ahead of the vehicle as the illumination beam (low beam). The shade 24 is disposed on the optical path between the reflective plate 23 and the lens 25b. The shade 24 includes a beam shielding section of a predetermined shape (cut-off pattern) and forms the cut-off pattern (cut-off line) of the illumination beam that is emitted from the lens 25b. The lens 25b projects an inverted image of the position of the shade 24 (position of the beam shielding section).

Figure 16B:
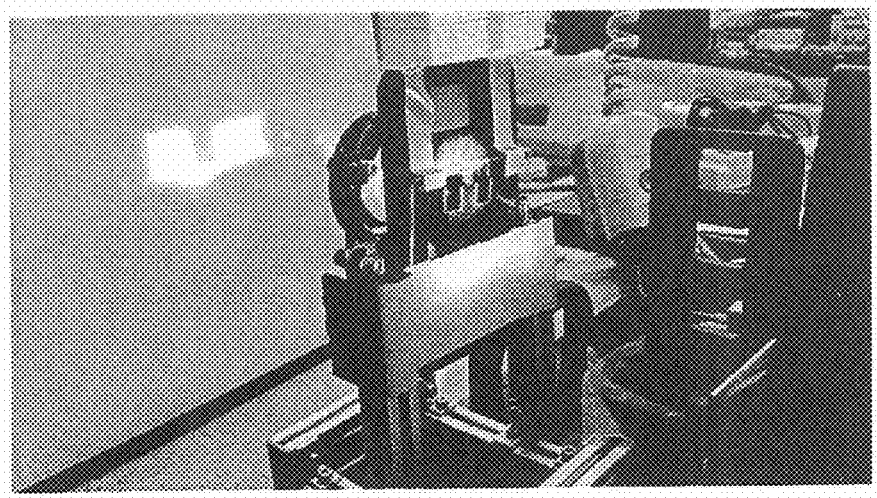
FIG. 16B is a photograph showing an actually assembled experimental optical system.

FIG. 16B illustrates a photograph showing an actually assembled experimental optical system (optical system corresponding to the lighting fixture according to Example 4).

Figure 17A:
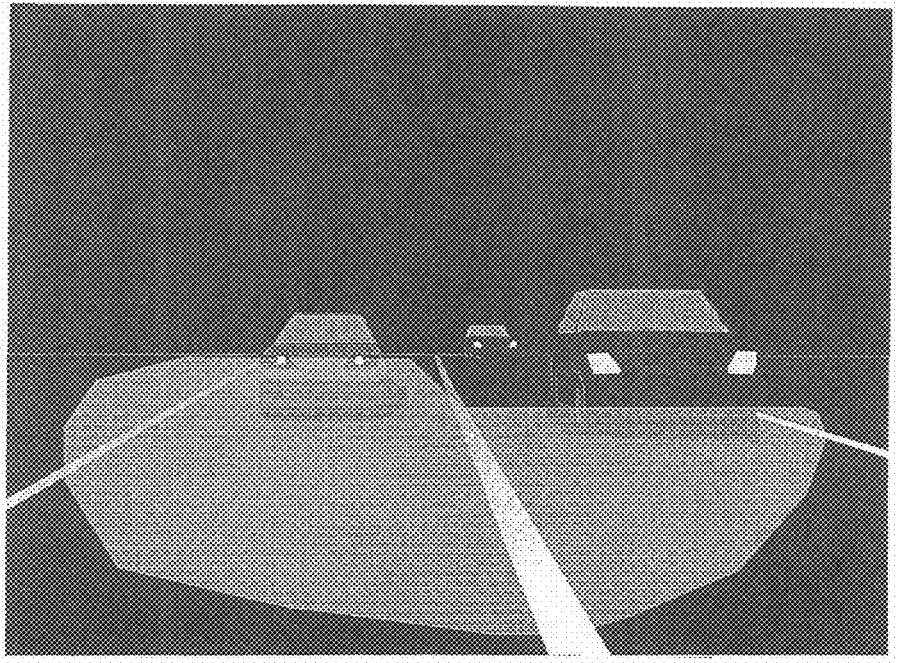
FIGS. 17A and 17B are schematic views illustrating examples of a beam distribution pattern obtained using the lighting fixture according to the example.
Figure 17B:
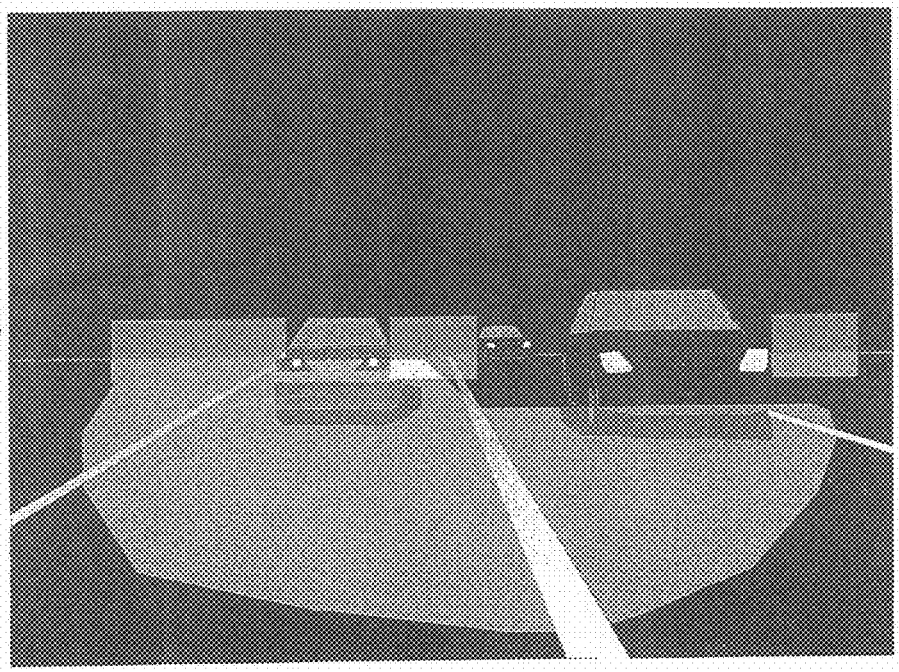

FIG. 17A and FIG. 17B illustrate examples of the beam distribution pattern obtained using the lighting fixture (vehicle headlight) according to Example 4. The drawings schematically illustrate a vehicle state and the beam distribution pattern (projection state) of the headlight which are visually recognized by a driver of an automobile.

FIG. 17A is the beam distribution pattern obtained when the entirety of pixels of the electrodeposition device 22 are in the mirror state. When the entirety of pixels are in the mirror state, the substantially entirety of beams pass through the low beam optical system and forms the beam distribution pattern illustrated in the drawing.

FIG. 17B is the beam distribution pattern obtained when a part of the pixels are in the transparent state and the rest of the pixels are in the mirror state in the electrodeposition device 22. Specifically, for example, in FIG. 15D, a negative voltage is applied to the segment electrodes $32a_2$, $32a_3$, $32a_4$, and $32a_6$ and a voltage difference is set the segment electrodes and the common electrode $32b$. In this case, pixels which become the transmission region are formed corresponding to electrodes $32a_1$, $32a_5$, $32a_7$, and $32a_8$ and pixels which become the reflective region are formed corresponding to electrodes $32a_2$, $32a_3$, $32a_4$, and $32a_6$. The beam incident to the pixels which become the transmission region passes through the high beam optical system and the beam incident to the pixels which become the reflective region passes through the low beam optical system and together form the beam distribution pattern illustrated in the drawing.

The beam distribution pattern in FIG. 17B is obtained by superimposing a region (beam distribution region), which is illuminated by the beam transmitted through the pixels corresponding to the electrodes $32a_1$, $32a_5$, $32a_7$, and $32a_8$, to the beam distribution pattern in FIG. 17A. The position and shape of the pixels which become the transmission region are reflected to the superimposed beam distribution region. That is, the illumination beam emitted from the high beam optical system illuminates the region of the position and shape corresponding to the pixels which become the transmission region. Meanwhile, the illumination beam emitted from the low beam optical system illuminates a certain region. This is because the lens 25a projects an image of a pixel formation position of the electrodeposition device 22 and the lens 25b projects an image of a position of the beam shielding section of the shade 24. The lighting fixture according to Example 4 changes the voltage applying state to the segment electrodes $32a_1$ to $32a_8$ and thus, it is possible to change the beam distribution region (projection image pattern) of the high beam.

The superimposed beam distribution region (voltage applying state to the segment electrodes $32a_1$ to $32a_8$) may be determined depending on, for example, a vehicle state such as a position of a vehicle ahead or an oncoming vehicle. In the example illustrated in FIG. 17B, the pixels which become the transmission region are selected such that a far region of a position where there is no vehicle ahead or oncoming is illuminated. The beam distribution pattern in FIG. 17B makes it possible to check, for example, a state of a far region in a forward direction or a state of the roadside. This is an example of a beam distribution pattern by which a good field of vision is secured, high safety of driving is achieved, and a state in which a driver of the vehicle ahead or oncoming is not blinded is realized.

The determination of the superimposed beam distribution region (selection of the pixels which become the transmission region) is performed by, for example, a driver. A sensor that detects a position of a vehicle ahead or oncoming is mounted in the vehicle, a control device is used, which electrically controls the pixel state (transparent state/mirror state) of the electrodeposition device 22 using the information obtained by the sensor, and thereby, automatic beam distribution control may be performed. In this case, it is possible to regularly obtain the beam distribution state in which high safety is realized.

Here, the vapor-deposited reflective surface becomes an ever-reflective region and thus, the low beam is formed regardless of the pixel state of the electrodeposition device 22. The configuration is not limited thereto, and the pixel electrodes may be arranged so as to be aligned on the entire surface of the electrodeposition device 22.

The lighting fixture according to Example 4 is the ADB that can form a beam distribution pattern depending on, for example, a vehicle state and that has high beam distribution controllability. High safety for all drivers of a self-drive vehicle, a vehicle ahead, and an oncoming vehicle is realized.

Further, it is possible to realize the ADB without using a moving section (mechanical means) and therefore, it is possible to achieve, for example, the miniaturization, thinness, or weight reduction. In addition, it is possible to realize the ADB that has high vibration resistance and high reliability with a low cost.

As described above with reference to FIG. 4A and FIG. 4B, both the transmittance when no voltage is applied and the transmittance when a voltage is applied to the electrodeposition device 22 are 80% or more. Therefore, the lighting fixture according to Example 4 has high light use efficiency of the light beam emitted from the light source 21.

Figure 18:
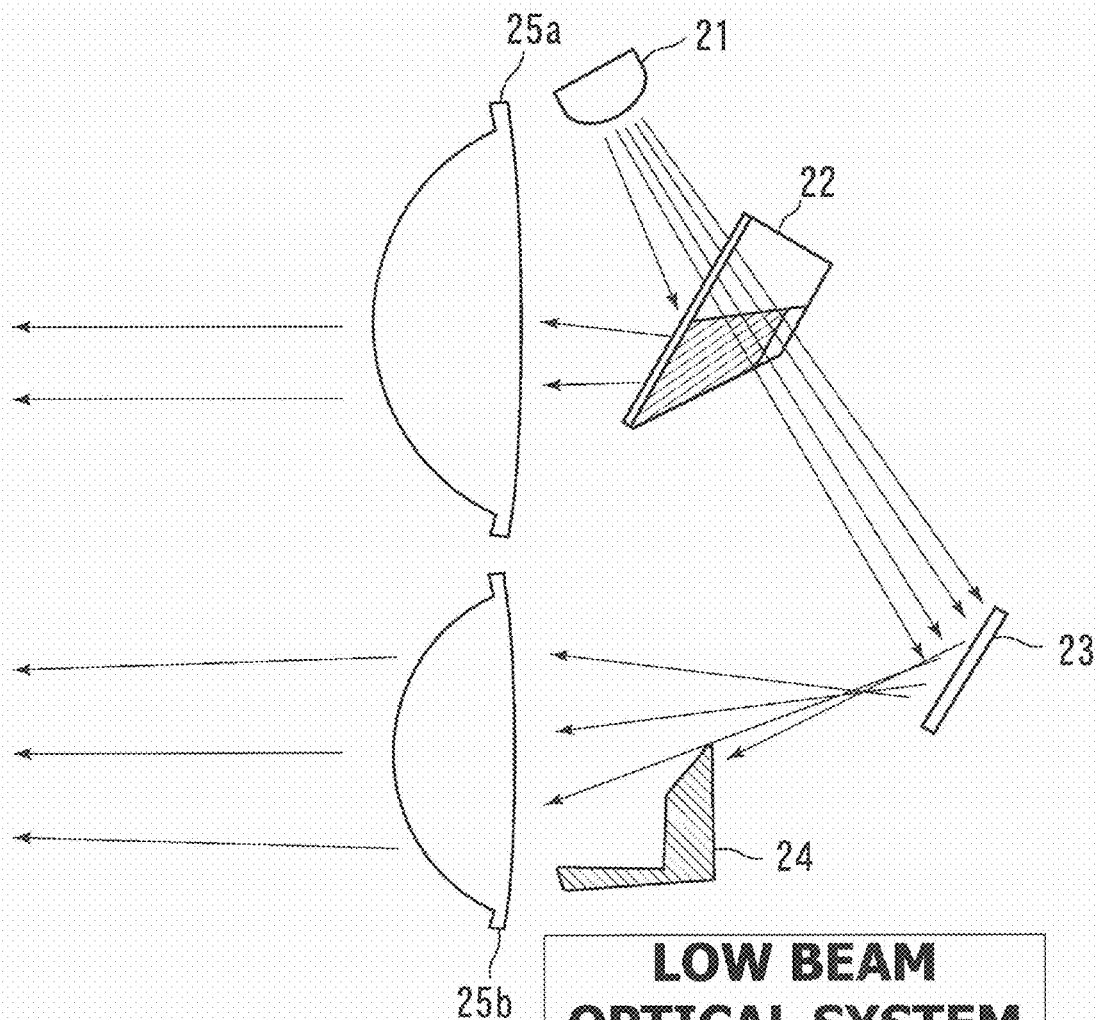
FIG. 18 is a schematic view illustrating a lighting fixture according to Example 5.

FIG. 18 is a schematic view illustrating the lighting fixture (vehicle headlight) according to Example 5. According to Example 4, the beam transmitted through the electrodeposition device 22 is incident to the high beam optical system and the beam reflected from the device is incident to the low beam optical system; however, according to Example 5, the beam reflected from the electrodeposition device 22 is incident to the high beam optical system and the beam transmitted through the device is incident to the low beam optical system. Here, the electrodeposition device 22 includes the eight square (dot-like) pixels on the lower side and no pattern is formed on the upper side. The other configurations are the same as those in the Example 4.

Similar to Example 4, according to Example 5, the light beam emitted from the light source 21 is incident to the arrangement position of the eight pixels of the electrodeposition device 22 and is transmitted through or reflected from the position depending on the state (transparent state/mirror state) of each pixel, and multiple beam distribution patterns are formed.

The light beam emitted from the light source 21 and transmitted through the pixel in the transparent state in the electrodeposition device 22 and a region where no pattern is formed is reflected from the reflective plate 23, is incident to the lens 25b through the shade 24, and then, is emitted ahead of a vehicle as the illumination beam (low beam). The lens 25b projects an inverted image of the position of the shade 24 (position of the beam shielding section).

The light beam emitted from the light source 21 and reflected from the pixels in the mirror state in the electrodeposition device 22 is transmitted through the lens 25a and is emitted ahead of the vehicle as the illumination beam (high beam). The lens 25a projects an inverted image of the position (pixel formation position) of the electrodeposition device 22.

In a case of using the lighting fixture according to Example 5, the entirety of pixels of the electrodeposition device 22 enter into the transparent state, the substantially entire light is incident to the low beam optical system, and it is possible to obtain the beam distribution pattern illustrated in the FIG. 17A.

In addition, the beam distribution pattern in FIG. 17B is obtained by, for example, applying a negative voltage to the segment electrodes $32a_1$, $32a_5$, $32a_7$, and $32a_8$.

The lighting fixture according to Example 5 can achieve the same effects as the lighting fixture according to Example 4.

In addition, according to Example 5, since the voltage is applied to the electrodeposition device 22 for the high beam which is relatively little used, a problem such as breakdown is less likely to occur and power consumption is lower, compared to Example 4 in which the voltage is applied to the electrodeposition device 22 for the low beam which is relatively often used. In addition, since the electrodeposition device 22 becomes transparent during the breakdown, it is preferable that an optical system that forms the low beam in the transparent state is employed and also, in this point, the lighting fixture according to Example 5 is more desirable than that according to Example 4.

Here, the pattern is not formed, a transparent region is maintained all the time, and thus, the low beam is formed regardless of the pixel state of the electrodeposition device 22. The configuration is not limited thereto, and the pixels may be formed on the entire surface of the electrodeposition device 22.

As above, the invention is described according to the examples, but the invention is not limited thereto.

For example, the gel-phase electrolyte layer is used; however, a liquid-phase electrolytic solution that contains a silver complex may be used. The electrolyte layer is configured to contain the electrolytic solution or an electrolyte film that contains the electrodeposition material.

In addition, for example, in Example 1, the case of forming four pixels is described. In Examples 4 and 5, the case of aligning eight pixels in a direction is described. The number of pixels (segment electrodes) and the arrangement of the pixels is not limited thereto. For example, the more number of dot-like pixels may be formed. It is possible to employ a configuration which includes not only the multiple segment electrodes but also the multiple common electrodes.

In addition, according to the examples, the silver is precipitated on the sides of the segment substrates 10*a* and 30*a*; however, for example, a positive voltage is applied to the sides of the segment substrates 10*a* and 30*a* and then, the silver may be caused to be precipitated at the positions on the common substrates 10*b* and 30*b* which face the segment electrodes.

In addition, the optical system is not limited to the examples illustrated in the drawings; however, it is possible to insert a lens or prism, scaling reflective plate, or the like on the optical path. Further, in the Examples 1 to 3, the illumination beam (low beam and high beam) is emitted from the single projector lens 4; however, the illumination beam may be emitted from multiple projector lens.

Further, according to Examples 4 and 5, the cut-off pattern (cut-off line) of the illumination beam is formed using the shade 24; however, it is possible to omit the shade 24 by using a reflective plate on which the cut-off pattern (beam distribution pattern) is formed. In this case, the lens 25*b* configures the optical system such that an inverted image of the position of the reflective plate is projected.

In addition, according to Examples 4 and 5, the low beam optical system is configured to include the reflective plate (flat mirror) 23, the shade 24, and the lens 25*b*; however, it is possible to substitute the components with a uneven reflective plate that forms the beam distribution pattern illustrated in FIG. 17A.

Further, according to Examples 4 and 5, the electrodeposition device 22 is disposed such that the light beam emitted from the light source 21 is entirely incident thereto. When the pixel electrodes are formed on the entire surface of the electrodeposition device 22 without providing the vapor-deposited reflective surface as in Example 4 or a no-pattern formed region as in Example 5, it is possible to emit only the high beam by causing the entirety of pixels to enter into the transparent state in the optical system arrangement of Example 4 and by causing the entirety of pixels to enter into the reflective state in the optical system arrangement of Example 5. Even in a case where the entire light incident to the pixel position is emitted as the high beam, it is preferable that there is slight illumination beams emitted as the low beam in the vehicle headlight. Therefore, the electrodeposition device 22 may be disposed such that the light beam emitted from the light source 21 is incident to a slightly broader range than that of the electrodeposition device 22 including the arrangement position of the eight pixels. In this case, for example, in the configuration of Example 4, the reflective surface is formed in a region is irradiated with the beam deviated from the pixels of the electrodeposition device 22 and reflects the light beam emitted from the light source 21. In the configuration of Example 5, the region that is irradiated with the beam deviated from the pixels of the electrodeposition device 22 is transparent and thus transmits the light beam emitted from the light source 21. In a case where the range of the beam incident to the electrodeposition device 22 is set to be slightly broader, there is a need to form the reflective surface in the Example 4; however, since the region surrounding the eight pixels is transparent, there is no need to perform a special addition in Example 5. In this point as well, the configuration of Example 5 is preferable.

In addition, it is obvious for those skilled in the art that it is possible to perform various modifications, improvements, combinations, or the like.

The invention may be appropriately used as a lighting fixture for a vehicle such as a four-wheel or two-wheel vehicle, for example, a vehicle headlight, a fog lamp, a tail lamp, or rear combination lamps.

What are claimed are:

1. A lighting fixture comprising:
a light source that emits an original light beam;
an electrodeposition device that includes multiple pixels of which a transparent state and a mirror state are switchable independently, and that is disposed on an optical path of the original light beam emitted from the light source such that a normal direction of a surface of the pixels is not parallel to an optical axis direction of the original light beam emitted from the light source; and
an optical system that emits, as an illumination beam, both a transmission beam transmitted through the electrodeposition device and a first reflection beam reflected from pixels in the mirror state in the electrodeposition device,
wherein the optical system includes:
a lens to which the transmission beam transmitted through the electrodeposition device is incident and which emits the illumination beam, and
a reflective member to which the first reflection beam reflected from the pixels in the mirror state in the electrodeposition device is incident, and
wherein a second reflection beam reflected from the reflective member is incident to a region of the electrodeposition device other than the pixels in the mirror state in the electrodeposition device and is transmitted through the region.

2. The lighting fixture according to claim 1,
wherein the illumination beam includes a first illumination beam and a second illumination beam, and
wherein the lens is configured to be a single lens that includes a first illumination beam emitting section that emits the first illumination beam and a second illumination beam emitting section that emits the second illumination beam and projects an image at a position of the electrodeposition device.

3. The lighting fixture according to claim 2,
wherein the second reflection beam reflected from the reflective member is transmitted through the electrodeposition device and is incident to the second illumination beam emitting section of the lens.

4. The lighting fixture according to claim 1,
wherein the first reflection beam reflected from the pixels in the mirror state in the electrodeposition device is incident to the reflective member and is reflected by the reflective member multiple times, and is incident to the region of the electrodeposition device other than the pixels in the mirror state in the electrodeposition device.

5. The lighting fixture according to claim 4,
wherein the electrodeposition device is disposed such that an angle between the normal direction of the surface of the pixels and the optical axis direction of the original light beam is 20° or greater.

6. The lighting fixture according to claim 2,
wherein the transparent state and the mirror state of the multiple pixels are sequentially switched in one direction and a cut-off pattern in the electrodeposition device is changed.

7. A lighting fixture comprising:
a light source that emits an original light beam;
an electrodeposition device that includes multiple pixels of which a transparent state and a mirror state are switchable independently, and that is disposed on an optical path of the original light beam emitted from the light source such that a normal direction of a surface of the pixels is not parallel to an optical axis direction of the original light beam emitted from the light source; and
an optical system that emits, as an illumination beam, both a transmission beam transmitted through the electrodeposition device and a first reflection beam reflected from pixels in the mirror state in the electrodeposition device,
wherein the optical system includes:
  a first optical system to which a transmission beam transmitted through pixels in the transparent state in the electrodeposition device is incident and which emits a first illumination beam, and
  a second optical system to which a first reflection beam reflected from the pixels in the mirror state in the electrodeposition device is incident and which emits a second illumination beam,
wherein the first optical system includes a first lens to which the transmission beam transmitted through the pixels in the transparent state in the electrodeposition device is incident and which emits the first illumination beam,
wherein the first lens projects an image at pixel positions of the electrodeposition device, and
wherein the electrodeposition device is disposed such that the pixels of the electrodeposition device are at a focal position of the first lens.

8. The lighting fixture according to claim 7,
wherein the second optical system emits the second illumination beam such that the second illumination beam illuminates a certain region.

9. The lighting fixture according to claim 8,
wherein the second optical system includes:
  a reflective plate to which the first reflection beam reflected from the pixels in the mirror state in the electrodeposition device is incident, and
  a second lens to which a second reflection beam reflected from the reflective plate is incident and which emits the second illumination beam,
wherein the reflective plate includes a cut-off pattern or a cut-off pattern is disposed on an optical path between the reflective plate and the second lens, and
wherein the second lens projects an image at a position of the cut-off pattern.

10. The lighting fixture according to claim 7,
wherein the electrodeposition device is disposed such that the original light beam emitted from the light source is incident to a broader range including an arrangement position of the multiple pixels, and
wherein a reflective surface is formed in a region surrounding the multiple pixels of the electrodeposition device.

11. A lighting fixture comprising:
a light source that emits an original light beam:
an electrodeposition device that includes multiple pixels of which a transparent state and a mirror state are switchable independently, and that is disposed on an optical path of the original light beam emitted from the light source such that a normal direction of a surface of the pixels is not parallel to an optical axis direction of the original light beam emitted from the light source; and
an optical system that emits, as an illumination beam, both a transmission beam transmitted through the electrodeposition device and a first reflection beam reflected from pixels in the mirror state in the electrodeposition,
wherein the optical system includes:
  a first optical system to which a transmission beam transmitted through pixels in the transparent state in the electrodeposition device is incident and which emits a first illumination beam, and
  a second optical system to which a first reflection beam reflected from the pixels in the mirror state in the electrodeposition device is incident and which emits a second illumination beam,
wherein the second optical system includes a second lens to which the first reflection beam reflected from the pixels in the mirror state in the electrodeposition device is incident, and which emits the second illumination beam, and
wherein the second lens projects an image at pixel positions of the electrodeposition device.

12. The lighting fixture according to claim 11,
wherein the first optical system emits the first illumination beam such that the first illumination beam illuminates a certain region.

13. The lighting fixture according to claim 12,
wherein the first optical system includes:
  a reflective plate to which the transmission beam transmitted through the pixels in the transparent state in the electrodeposition device is incident, and
  a first lens to which a second reflection beam reflected from the reflective plate is incident and which emits the first illumination beam,
wherein the reflective plate includes a cut-off pattern or a cut-off pattern is disposed on an optical path between the reflective plate and the first lens, and
wherein the first lens projects an image at a position of the cut-off pattern.

14. The lighting fixture according to claim 11,
wherein the electrodeposition device is disposed such that the original light beam emitted from the light source is incident to a broader range including an arrangement position of the multiple pixels, and
wherein a region surrounding the multiple pixels of the electrodeposition device is transparent.

* * * * *